(12) United States Patent
Brooker

(10) Patent No.: US 9,088,540 B1
(45) Date of Patent: Jul. 21, 2015

(54) PROCESSING DATA FORMATTED FOR EFFICIENT COMMUNICATION OVER A NETWORK

(71) Applicant: Amazon Technologies, Inc., Reno, NV (US)

(72) Inventor: Marc John Brooker, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 37 days.

(21) Appl. No.: 13/874,048

(22) Filed: Apr. 30, 2013

Related U.S. Application Data

(62) Division of application No. 12/940,728, filed on Nov. 5, 2010, now Pat. No. 8,438,275.

(51) Int. Cl.
  *G06F 15/16* (2006.01)
  *H04L 29/08* (2006.01)
  *H04L 12/26* (2006.01)

(52) U.S. Cl.
  CPC .............. *H04L 67/02* (2013.01); *H04L 43/04* (2013.01); *H04L 43/18* (2013.01)

(58) Field of Classification Search
  None
  See application file for complete search history.

(56) References Cited

U.S. PATENT DOCUMENTS

| | | | |
|---|---|---|---|
| 6,035,333 A | 3/2000 | Jeffries et al. | 709/224 |
| 6,085,165 A * | 7/2000 | Ulwick | 705/7.32 |
| 6,684,247 B1 * | 1/2004 | Santos et al. | 709/224 |
| 6,829,223 B1 * | 12/2004 | Richardson et al. | 370/241 |
| 6,912,568 B1 | 6/2005 | Nishiki et al. | 709/223 |
| 8,024,613 B2 | 9/2011 | Ochi et al. | 714/30 |
| 2006/0167939 A1 * | 7/2006 | Seidman et al. | 707/104.1 |
| 2008/0126538 A1 | 5/2008 | Uyama et al. | 709/224 |
| 2011/0295993 A1 | 12/2011 | Ochi et al. | 709/223 |
| 2011/0307602 A1 | 12/2011 | Kanemasa | 709/224 |
| 2012/0246157 A1 | 9/2012 | Theimer et al. | 707/736 |

OTHER PUBLICATIONS

C. Poulliat, P. Vila, D. Pirez, I. Fijalkow, "Progressive quality JPEG2000 image transmission over noisy channel", in *Proc. EUSIPCO 2002*, vol. III, pp. 205-208, Toulouse, France, Sep. 2002, 4 pgs.

H. Yousefi'zadeh, H. Jafarkhani, F. Etemadi, "Transmission of Progressive Images over Noisy Channels: an End-to-End Statistical Optimization Framework", Selected Topics in Signal Processing, IEEE Journal of vol. 2, Issue 2, Digital Object Identifier: 10.1109/JSTSP.2008.923581, pp. 220-231, 2008.

VLC media player, VideoLAN project, http://git.videolan.org/?p=ffmpeg.git;a=blob_plain;f=Changelog, (14 pgs), Printed Feb. 9, 2012.

Dirac, Video Compression, http://diracvideo.org/specificiations, (1 pg), Printed Feb. 9, 2012.

Dirac Specification, Version 2.2.3, Issued: Sep. 23, 2008, (136 pgs).

(Continued)

*Primary Examiner* — Brian P Whipple
(74) *Attorney, Agent, or Firm* — Baker Botts L.L.P.

(57) ABSTRACT

In certain embodiments, a computer-implemented method includes receiving, at a first time, a first set of prioritized transfer data that corresponds to a first portion of time series data. A reverse transform is applied to the first set of prioritized transfer data to generate first reformatted time series data. At a second time, a second set of prioritized transfer data that corresponds to a second portion of the time series data is received. A reverse transform is applied to the second set of prioritized transfer data to generate second reformatted time series data.

16 Claims, 11 Drawing Sheets

(56) References Cited

OTHER PUBLICATIONS

Encapsulation of Dirac in ISO/IEC 13818-1, 33b8f8ac draft +uncommitted changes 2008-07-16T16:15:56+0000, British Broadcasting Corporation, (8 pgs), Jul. 16, 2008.
Encapsulation of Dirac in Ogg, v1.0 2008-10-08T13:12:37+0000, British Broadcasting Corporation, (10 pgs), Oct. 8, 2008.
Encapsulation of Dirac in ISO Base Media file format derivatives, v1.0prel 2008-07-16T15:35:42+0000, British Broadcasting Corporation, Encapsulation of Dirac in ISO/IEC 14496-12 derivatives, (9 pgs), Jul. 16, 2008.
Snow, From Multimedia Wiki; http://wiki.multimedia.ex/index.php?title=Snow& printable=yes (1 pg), Last printed Feb. 9, 2012, page last modified Sep. 11, 2010.
FFmpeg, Project Description, News, http:/git.ffmpeg.org/?p=ffmpeg;a=blob_plain;f=doc/snow.txt, (18 pgs), Last printed Feb. 9, 2012 (various dates listed in document from Mar. 9, 2007-Jan. 27, 2012).
About FFmpeg, http://ffmpeg.org/about.html, (2 pgs), Last printed Feb. 9, 2012.
FFmpeg Download and Source Code Repository Access, http://ffmpeg.org/download.html, 4 pgs, Last printed Feb. 9, 2012.
FFmpeg Documentation, http://ffmpeg.org/ffmpeg.html, (149 pgs), Last printed Feb. 9, 2012.
FFmpeg Documentation, http://ffmpeg.org/documentation.html, (2 pgs), Last printed Feb. 17, 2012.
FFmpeg FAQ, http://ffmpeg.org/faq.html, (10 pgs), Last printed Feb. 10, 2012.
General Documentation, http://ffmpeg.org/general.html, (18 pgs), Last printed Feb. 10, 2012.
Libavfilter Documentation, http://ffmpeg.org/libavfilter.html, (64 pgs), Last printed Feb. 10, 2012.
Developer Documentation, http://ffmpeg.org/developer.html, (8 pgs), Last printed Feb. 10, 2012.
FFmpeg at Zcranoc.com, Welcome to Zeranoc FFmpeg, http://ffmpeg.zcranoc.com/, (1 pg), Last printed Feb. 10, 2012.
FFmpeg on Mac OS X How-to, http://stephenjungels.com/jungels.net/articles/ffmpeg.howto.html, (6 pgs.), Last printed Feb. 10, 2012.
Main Page, from Multimedia Wiki, http://wiki.multimedia.ex/index.php?title=Main_Page, 2 pgs, Last printed Feb. 10, 2012.
FFmpeg Documentation, http://ffmpeg.org/ffmpeg.html, (147 pgs), Last printed Feb. 10, 2012.
FFplay Documentation, http://ffmpeg.org/ffplay.html, (108 pgs), Last printed Feb. 10, 2012.
FFprobe Documentation, http://ffmpeg.org/ffprobe.html, (34 pgs), Last printed Feb. 10, 2012.
FFserver Documentation, http://ffmpeg.org/ffserver.html, (9 pgs), Last printed Feb. 10, 2012.
Sample ffserver configuration file, http://ffmpeg.org/sample.html, (7 pgs), Last printed Feb. 10, 2012.
FFmpeg: Main Page, FFmpeg Documentation, http://ffmpeg.org/doxygen/trunk/index.html, (1 pg), Last printed Feb. 10, 2012.
FFmpeg codec HowTo—Multimedia Wiki, http://wiki.muitimedia.ex/index.php?title=FFmpeg_codec_HOWTO, (6 pgs), Last printed Feb. 10, 2012.
FFmpeg demuxer HowTo—Multimedia Wiki, http://wiki.multimedia.ex/index.php?title=FFmpeg_demuxer_HOWTO, (2 pgs), Last printed Feb. 10, 2012.
FFmpeg filter HowTo—Multimedia Wiki, http://wiki.multimedia.ex/index.php?title-FFmpeg_filter_HOWTO, ( 7 pgs.), Last printed Feb. 10, 2012.
Using libavformat and libavcodec, Martin Bohme, Feb. 18, 2004, http://www.inb.uni-luebeck.de/~boehme/using_libavcodec.html, (5 pgs), Last printed Feb. 10, 2012.
An ffmpeg and SDL Tutorial or How to Write a Video Player in Less Than 1000 Lines, http://dranger.com/ffmpeg/, (3 pgs), Last printed Feb. 10, 2012.
ISO/IEC 15444-1, Second edition Sep. 15, 2004, Information Technology—JPEG 2000 Image Coding System: Core Coding System, Reference No. ISO/IEC 15444-1:2004(E) (210 pgs).
ISO/IEC 15444-1, Second edition Sep. 15, 2004/Amendment 1 Jan. 1, 2006, Information Technology—JPEG 2000 Image Coding System: Core Coding System, Amendment 1: Profiles for digital cinema applications, Reference No. ISO/IEC 15444-1:2004/Amd.1:2006(E) (8 pgs).
ISO/IEC 15444-1:2004, Technical Corrigendum 1, Information Technology—JPEG 2000 Image Coding System: Core Coding System, Technical Corrigendum 1, Reference No. ISO/IEC 15444-1:2004/Cor.1:2007(E), ICS 35.040 (4 pgs), published Jul. 15, 2007.
ISO/IEC 15444-1:2004, Technical Corrigendum 2, Information Technology—JPEG 2000 Image Coding System: Core Coding System, Technical Corrigendum 2: Clarification on determination of maximum file size, Reference No. ISO/IEC 15444-1:2004/Cor.2:2008(E), ICS 35.040 (3 pgs), published Apr. 15, 2008.
ISO/IEC 15444-1, Second edition Sep. 15, 2004/Amendment 2 Dec. 15, 2009, Information Technology—JPEG 2000 Image Coding System: Core Coding System, Amendment 2: Extended profiles for cinema and video production and archival applications, Reference No. ISO/IEC 15444-1:2004/Amd.2:2009(E) (10 pgs).
ISO/IEC 15444-1, Second edition Sep. 15, 2004/Amendment 3 Dec. 15, 2010, Information Technology—JPEG 2000 Image Coding System: Core Coding System, Amendment 3: Profiles for broadcast applications, Reference No. ISO/IEC 15444-1:2004/Amd.3:2010(E) (14 pgs).
ISO/IEC 15948, First edition Mar. 1, 2004, Information Technology—Computer Graphics and Image Processing—Portable Network Graphics (PNG): Functional Specification, Reference No. ISO/IEC 15948:2004(E) (76 pgs).

* cited by examiner

202a { Time Series Data = [1.0 1.1 2.3 2.9 2.1 0.9]

202b {
Coefficient Groups Comprising Coefficients:
Approx = [3.67438258, 3.95540666, 3.04661039, 3.54032238, 4.15910785, 2.34896603]  ← 204a
Detail_0 = [-0.59420417, -1.96163418, -0.17542875, 0.05005024, 0.83001975, 1.85119711]  ← 204b
Detail_1 = [0.0835785, 0.31220127, -0.57419103, 0.62609388, -0.44767997, 0.08357585]  ← 204c 202c {
Quantized Coefficient Data:
A_0 = [3, 3, 3, 3, 4, 2]
A_1 = [0.6, 0.9, 0.0, 0.5, 0.1, 0.3]
A_2 = [0.07, 0.05, 0.04, 0.04, 0.05, 0.04]....

Detail_0_0 = [0, -1.96163418, 0, 0, 0, 1.85119711]  ← 206a
Detail_0_1 = [0, 0, 0, 0, 0.83001975, 0]
Detail_0_2 = [-0.59420417, 0, 0, 0, 0, 0,]....  ← 206b Detail_1_0 = [0, 0, 0, 0.62609388, 0, 0]  ← 206c
Detail_1_1 = [0, 0, -0.57419103, 0, -0.44767997, 0]
Detail_1_2 = [0.31220127, 0, 0, 0]
Detail_1_3 = [0.0835785, 0, 0, 0, 0.08357585]

202d {
Prioritized Transfer Data
A_0, A_1, A_2, Detail_0_0, Detail_0_1, Detail_1_0, Detail_0_2, Detail_1_1, Detail_1_2,  ← 208
Detail_1_3

PROCESSING DATA FORMATTED FOR EFFICIENT COMMUNICATION OVER A NETWORK

RELATED APPLICATION

This divisional application claims the benefit under 35 U.S.C. §120 and 121 of the priority of U.S. patent application Ser. No. 12/940,728, filed Nov. 5, 2010, entitled "Formatting Data for Efficient Communication Over a Network."

BACKGROUND

It is often appropriate to communicate information from one computer system to a remote computer via one or more network connections. In many scenarios, this information comprises a large amount of information. Transmitting large amounts of information in an efficient manner may be problematic when the one or more network connections have inadequate or otherwise limited bandwidth. These problems may be particularly apparent when the information is for presentation on the remote computer system that receives the information via the one or more network connections. For example, if a user of the remote computer system who desires to view a representation of the information must wait for all of the information to be received over the one or more network connections, it can be not only irritating for the user but also delay use of the information by the user. Depending on the purpose for which the user desires the information, this delay can have detrimental effects.

BRIEF DESCRIPTION OF THE DRAWINGS

For a more complete understanding of the present disclosure and its advantages, reference is made to the following descriptions, taken in conjunction with the accompanying drawings, in which:

FIG. 2 illustrates example processing of an example data set, which may be performed by the example system of FIG. 1 according to certain embodiments of a present disclosure;

DESCRIPTION OF EXAMPLE EMBODIMENTS

Figure 1:
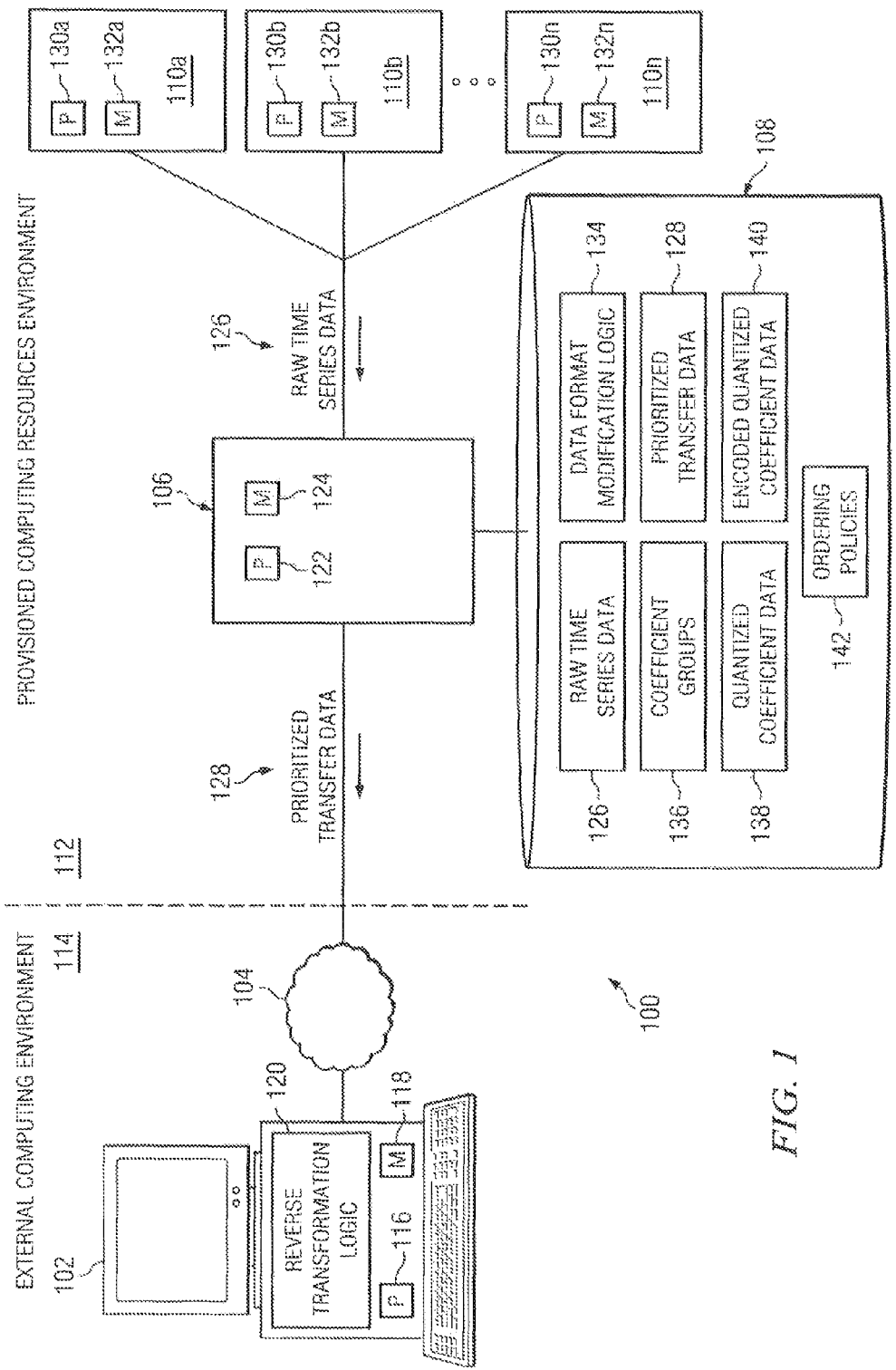
FIG. 1 illustrates an example system for formatting data for communication over a network, according to certain embodiments of the present disclosure.

Communicating large amounts of data over bandwidth-constrained network connections can present difficult challenges. A particular type of data that can prove challenging is time-series data, which often involves a large amount of data that traditionally is communicated strictly in the time-order in which it was generated. Time series data generally includes data that is a parameter for which a value is measured at a series of times. For example, time series data may include data that is sampled at particular time intervals. Thus, time series data may include a sequence of values measured at a time interval (e.g., once per minute). The time interval, or sampling rate, may be constant or it may change. It is often desirable to view time series data, which may be received and or generated at first computer system, at a second computer system that is remote from the first computer system. Viewing the times series data may include viewing one or more representations of the time series data, such as one or more graphs of the values included in the time series data. These graphs may illustrate how a measured characteristic changes over time.

A particular type of time series data is service metrics data. Service metrics data may include data generated in association with making one or more computing resources available over a network. For example, a management application for managing the provision of computing resources over a network may generate or otherwise monitor service metrics data regarding system performance associated with providing the computing resources over the network. It may be appropriate to communicate a portion or all of this service metrics data over a communication network to a remote computer system for viewing a representation of the service metrics data on the remote computer system.

Embodiments of the present disclosure provide techniques for organizing, compressing, and otherwise manipulating data (e.g., time series data) in a manner suitable for more efficient transfer of the data to a remote computer system. These techniques may include applying an integral transform such as the discrete wavelet transform to the raw data that is to be communicated to the remote computer system. Application of this transform may categorize the data in a transform domain that is different from the domain in which the raw data is captured. For example, where the data is time series data and the transform is a wavelet transform, the time series data may be transformed from the time domain to the wavelet domain. In certain embodiments, one or more quantization and/or encoding algorithms are applied to the transformed data prior to transferring the transformed data to the remote computer system. Often, portions of the data to be communicated over the network to the remote computer system are more important or otherwise more useful to the recipient than other portions of the data. Thus, as will be described in greater detail below, embodiments of the present disclosure order the processed data according to one or more ordering policies prior to transferring the data to the remote computer system.

FIG. 1 illustrates an example system 100 for formatting data for communication over a network, according to certain embodiments of the present disclosure. In the illustrated example, system 100 includes a user system 102, a network 104, a server system 106, a storage module 108, and one or more computing resources 110. Although system 100 is illustrated and primarily described as including particular components, the present disclosure contemplates system 100 including any suitable components, according to particular needs.

In general, portions of system 100 provide an environment in which data from one or more computing resources (e.g., computing resources 110) is made available over a communication network to one or more remote computer systems, such as user system 102. In certain embodiments, server system 106, storage module 108, and computing resources 110 may be communicatively coupled together over a high speed communication network and collectively may comprise a computing infrastructure, which may be referred to as a provisioned computing resources environment 112. User system 102 and/or network 104 may be external to the provisioned computing resources environment and may be referred to as an external computing environment 114.

In certain embodiments, provisioned computing resources environment 112 (including, for example, one or more of server system 106, storage module 108, and computing resources 110) may provide a collection of remote computing services offered over a network (which may or may not be network 104). Those computing services may include, for example, storage, compute processing, networking, applications, or any other suitable computing resources that may be made available over a network. In certain embodiments, entities accessing those computing services may gain access to a suite of elastic information technology (IT) infrastructure services (e.g., computing resources 110) as the entity requests those services. Provisioned computing resources environment 112 may provide a scalable, reliable, and secure distributed computing infrastructure.

In association with making those computing resources 110 available over the network (e.g., provisioning the computing resources 110), a variety of performance parameters may be generated. These performance parameters may be a type of time series data and may be referred to as service metrics data. Particular example service metrics data may include latency (e.g., average latency), CPU usage, number of processes running in an operating system of a host computing system (e.g., a computing resource 110), memory usage, input/output rates, network bandwidth, data storage capacities, and any other suitable metrics associated with computing resources 110.

Portions of system 100 (e.g., computing resources 110) may generate a large amount of service metrics data. It may be appropriate to communicate a portion or all of this service metrics data over a network (e.g., network 104) to a remote computer system (e.g., user system 102), so that the remote computer system (e.g., user system 102) may use the communicated service metrics data. For example, service metrics data may be communicated over a network (e.g., network 104) to a remote computer system (e.g., user system 102), so that a user of the remote computer system can view the service metrics data or a representation of the service metrics data (e.g., in one or more graphs). A user or other entity may view service metrics data, including potentially a representation of service metrics (e.g., a graph), to determine that status and/or performance of computing resources (e.g., computing resources 110), which may allow performance issues to be identified and resolved, as well as provide other suitable capabilities. As another example, service metrics data may be communicated over a network (e.g., network 104) to a remote computer system (e.g., user system 102), so that the remote computer system can perform one or more substantially automated actions based on the service metrics data as the service metrics data. The remote computer system may analyze the service metrics data as it is received and perform one or more suitable actions based on that analysis (e.g., generate an alert based on an automatically determined status of computing resources 110 or perform some other suitable action). Some embodiments of the present disclosure transform data (e.g., time series data) from its raw format to a format suitable for efficient transfer over a communication network (e.g., network 104) to a remote computer system (e.g., user system 102).

User system 102 may include one or more computer systems at one or more locations. Each computer system may include any appropriate input devices, output devices, mass storage media, processors, memory, or other suitable components for receiving, processing, storing, and communicating data. For example, each computer system may include a personal computer, workstation, network computer, kiosk, wireless data port, personal data assistant (PDA), one or more Internet Protocol (IP) telephones, smart phones, table computers, one or more servers, a server pool, one or more processors within these or other devices, or any other suitable processing device. User system 102 may be a stand-alone computer or may be a part of a larger network of computers associated with an entity.

User system 102 may include processing unit 116 and memory unit 118. Processing unit 116 may include one or more microprocessors, controllers, or any other suitable computing devices or resources. Processing unit 116 may work, either alone or with other components of system 100, to provide a portion or all of the functionality of system 100 described herein. Memory unit 118 may take the form of volatile or non-volatile memory including, without limitation, magnetic media, optical media, RAM, ROM, removable media, or any other suitable memory component.

In general, user system 102 receives via network 104 data associated with monitoring the provision of computing resources 110 over a network (which may or may not be network 104). This data may include service metrics data associated with monitoring the provision of computing resources 110 over a network. A user of user system 102 may include, for example, a person capable of monitoring the operation and status of computing resources 110. As a more particular example, a user of system 102 may be associated with an entity that makes computing resources (e.g., computing resources 110) available over a network, and may be responsible for ensuring that the computing resources are operating in an appropriate manner (or for providing other suitable oversight of the computing resources). Additionally or alternatively, a user of system 102 may be associated with an entity using the computing resources (e.g., computing resources 110) made available over a network.

In certain embodiments, user system 102 includes reverse transformation logic 120. Reverse transformation logic 120 may include any suitable combination of hardware, firmware, and software. Functionality provided by reverse transformation logic 120 is described in greater detail below. In general, however, reverse transformation logic 120 is operable to receive data from server system 106 (e.g., prioritized transfer data 128, described below) and to transform that received data into a format suitable for use by user system 102. Reverse transformation logic 120 may be a part of a larger management application for monitoring or otherwise managing the provision of computing resources 110 over a network.

Network 104 facilitates wireless or wireline communication. Network 104 may communicate, for example, IP packets, Frame Relay frames, Asynchronous Transfer Mode (ATM) cells, voice, video, data, and other suitable information between network addresses. Network 104 may include one or more local area networks (LANs), radio access networks (RANs), metropolitan area networks (MANs), wide area networks (WANs), mobile networks (e.g., using WiMax (802.16), WiFi (802.11), 3G, or any other suitable wireless technologies in any suitable combination), all or a portion of the global computer network known as the Internet, and/or any other communication system or systems at one or more locations, any of which may be any suitable combination of wireless and wireline.

Server system 106 may include one or more computer systems at one or more locations. Each computer system may include any appropriate input devices, output devices, mass storage media, processors, memory, or other suitable components for receiving, processing, storing, and communicating data. For example, each computer system may include a personal computer, workstation, network computer, kiosk, wireless data port, PDA, one or more IP telephones, one or more servers, a server pool, one or more processors within these or other devices, or any other suitable processing device. Server system 106 may be a stand-alone computer or may be a part of a larger network of computers associated with an entity.

Server system 106 may include processing unit 122 and memory unit 124. Processing unit 122 may include one or more microprocessors, controllers, or any other suitable computing devices or resources. Processing unit 122 may work, either alone or with other components of system 100, to provide a portion or all of the functionality of system 100 described herein. Memory unit 124 may take the form of volatile or non-volatile memory including, without limitation, magnetic media, optical media, RAM, ROM, removable media, or any other suitable memory component.

Server system 106 may facilitate making computing resources 110 available over a network (which may or may not be network 104) and may manage the provision of computing resources 110 to other computing systems over the network. For example, server system 106 may control access to and rationing of computing resources 110 to other computing systems over a network.

In certain embodiments, server system 106 may receive raw service metrics data 126 from computing resources 110 and may communicate prioritized transfer data 128 to user system 102 via network 104. As described briefly above, various performance parameters may be measured in the course of making computing resources 110 available over a network. These performance parameters may be referred to as service metrics data. It may be desirable to present a portion or all of the service metrics data to user system 102. However, bandwidth limitations of network 104 may present challenges in the efficient display of the service metrics data to a user of user system 102. For example, network 104 may be relatively bandwidth limited, such as if network 104 is a cellular data network or when network 104 is experiencing heavy network traffic. Server system 106 may provide an ability to transform the raw service metrics data 126 into a format (e.g., prioritized transfer data 128) suitable for more efficient transfer to and display on user system 102.

Raw service metrics data 126 may include time series data representing the performance of computing resources 110. Raw service metrics data 126 is described in greater detail below.

Prioritized transfer data 128 may include processed portions of raw service metrics data 126, which have been formatted in accordance with embodiments of the present disclosure for more efficient transfer to user system 102. Prioritized transfer data 128 is described in greater detail below.

Computing resources 110 may include any suitable computing resources that may be made available over a network (which may or may not be network 104). Computing resources 110 may include any suitable combination of hardware, firmware, and software. As just a few examples, computing resources 110 may include any suitable combination of applications, power, processors, storage, and any other suitable computing resources that may be made available over a network. Computing resources 110 may each be substantially similar to one another or may be heterogeneous. As described above, entities accessing computing services provided by the provisioned computing resources environment may gain access to a suite of elastic IT infrastructure services (e.g., computing resources 110) as the entity requests those services. Provisioned computing resources environment may provide a scalable, reliable, and secure distributed computing infrastructure.

In the illustrated example, each computing resource 110 comprises processing unit 130 and memory unit 132. Processing unit 130 may include one or more microprocessors, controllers, or any other suitable computing devices or resources. Processing unit 130 may work, either alone or with other components of system 100, to provide a portion or all of the functionality of system 100 described herein. Memory unit 132 may take the form of volatile or non-volatile memory including, without limitation, magnetic media, optical media, RAM, ROM, removable media, or any other suitable memory component. In certain embodiments, a portion of all of memory unit 132 may include a database, such as one or more structured query language (SQL) servers or relational databases.

Server system 106 may be coupled or otherwise associated with a storage module 108. Storage module 108 may take the form of volatile or non-volatile memory including, without limitation, magnetic media, optical media, RAM, ROM, removable media, or any other suitable memory component. In certain embodiments, a portion of all of storage module 108 may include a database, such as one or more SQL servers or relational databases. Storage module 108 may be a part of or distinct from memory unit 124 of server system 106.

Storage module 108 may store a variety of information and applications that may be used by server system 106 or other suitable components of system 100. In the illustrated example, storage module 108 may store data format modification logic 134, raw time series data 126, one or more coefficient groups 136, quantized coefficient data 138, encoded quantized coefficient data 140, prioritized transfer data 128, and ordering policies 142, each of which are described in greater detail below. Although storage module 108 is described as including this particular information and applications, storage module 108 may store any other suitable information and applications. Furthermore, although these particular information and applications are described as being stored in storage module 108, the present description contemplates storing this particular information and applications in any suitable location, according to particular needs.

System 100 (e.g., computing resources 110) may generate a large amount of time series data 126 (e.g., service metrics data), a portion or all of which may be provided to server system 106 (e.g., as raw time series data 126) and potentially stored in storage module 108 (e.g., as raw time series data 126). It may be appropriate to communicate a portion or all of this time series data 126 over network 104 to user system, so that a user of user system 102 can view time series data 126 and/or a representation of times series data 116 (e.g., in one or more graphs). However, given the potential large quantity of time series data 126, it may be appropriate to transform raw time series data 126 from its raw format to another format (e.g., prioritized transfer data 128) more suitable for efficient communication over network 104 and display on user system 112. The components of storage module 108 may facilitate performing this transformation.

Data format modification logic 134 may comprise any suitable combination of hardware, firmware, and software. Data format modification logic 134 may handle reformatting of raw time series data 126 from its raw format to prioritized transfer data 128. In certain embodiments, data format modification logic 134 may be a part of a larger application for monitoring or otherwise managing the provision of computing resources 110 over a network.

Raw time series data 126 may be raw time series data 126 or any suitable derivative thereof. For example, server system 106 may receive raw time series data 126 and store the received raw time series data 126 in storage module 108 as raw time series data 126. In certain embodiments, time series data 126 comprises service metrics data associated with the provision of computing resources 110 over network 104. The service metrics data may measure any suitable performance parameters associated with the provision of computing resources 110 over network 104, as well as any other suitable parameters. Particular example raw service metrics data include latency (e.g., average latency), CPU usage, number of processes running in an operating system of a host computing system (e.g., a computing resource 110), memory usage, and any other suitable metrics.

Server system 106 (e.g., data format modification logic 134) may access raw time series data 126 in any suitable manner. For example, server system 106 (e.g., data format modification logic 134) may poll computing resources 110 (or any suitable intervening component, such as an aggregator) for raw time series data 126. As another example, computing resources 110 (or any suitable intervening component, such as an aggregator) may automatically communicate raw time series data 126 to server system 106 (e.g., data format modification logic 134) without waiting for a request for raw time series data 126. Data format modification logic 134 may store the received raw time series data 126 in storage module 108 as raw time series data 126.

Although described as "raw," the present disclosure contemplates any suitable pre-processing of raw time series data 126 prior to receipt by server system 106 (e.g., data format modification logic 134) of raw time series data 126 and/or prior to storage of raw time series data 126 in storage module 108. For example, server system 106 (or another suitable component of system 100) may format (or reformat) raw time series data 126 prior to storing the received raw time series data 126 in storage module 108. As another example, server system 106 (or another suitable component of system 100) may perform any suitable aggregation of raw time series data 126 prior to storing the received raw time series data 126 in storage module 108. As a particular example of an aggregation, server system 106 (or another suitable component of system 100) may compute averages of raw time series data 126 over time periods that are longer than the interval at which the values of raw time series data 126 are collected.

As described above, raw time series data 126 (e.g., service metrics data) may be voluminous. Furthermore, raw time series data 126 may be in a particular domain (time, in this example). It may be appropriate to apply a transform algorithm to raw time series data 126 to transform raw time series data 126 from its raw form (in a first domain) to another form (in a second domain). This transformed data may also be easier to manipulate and further compress for efficient communication over network 114.

Coefficient groups 136 may be generated by applying a transform to a suitable portion of raw time series data 126. For example, data format modification logic 134 may transform certain values of raw time series data 126 into a number of coefficient groups 136. Each coefficient group 126 may include one or more coefficients. In certain embodiments, data format modification logic 134 may transform the values of raw time series data 126 into coefficient groups 136 by applying a wavelet transform to the values of raw time series data 126. As a particular example, the wavelet transform may be the discrete wavelet transform; however, the present disclosure contemplates using any suitable transform, according to particular needs. Other example transforms that may be used include the discrete cosign transform and the discrete Fourier transform. Furthermore, in one example, the basis for the discrete wavelet transform may be the Haar basis.

Raw time series data 126 may be thought of as the "signal" for the wavelet transform. Applying a transform, such as the discrete wavelet transform, to raw time series data 126 may categorize the values of raw time series data 126 in the transform domain. For example, application of a wavelet transform may transform raw time series data 126 from the time domain into a wavelet domain.

Each coefficient group 126 for a given application of the selected transform may provide progressively more specific levels of detail of raw time series data 126. For example, a first coefficient group 126 may provide a first level of detail of raw time series data 126, while each additional coefficient group 126 provides progressively more specific levels of detail of raw time series data 126.

In certain embodiments, a first coefficient group 126 may be referred to as approximation coefficients and each additional coefficient group 126 may be referred to as detail coefficients. The approximation coefficients may be indicative of one or more trends across the values of raw time series data 126 according to a first level of detail. For example, the approximation coefficients may comprise relatively few points showing overall trends in the data, thereby ultimately permitting generation of a graph that provides a rough approximation of the overall shape of raw time series data 126. Each detail coefficient group 126 may provide additional details of raw time series data 126. For example, a first detail coefficient group 126 may provide detailed spikes in the raw time series data 126, and a second detail coefficient group 126 may provide even greater detail (possibly noise) in the raw time series data 126. In this example, the detailed spikes of the first detail coefficient group 126 provide a more specific level of detail than the overall trends indicated by the approximation coefficient group 126, and the details of the second detail coefficient group 126 provides yet a more specific level of detail than the detailed spikes of the first detail coefficient group 126. Although one approximation coefficient group 126 and two detail coefficient groups 136 are described in this example, the present disclosure contemplates the transformation of raw time series data 126 resulting in any suitable number of approximation and detail coefficient groups 136.

The various levels of detail may correspond to time periods. For example, the approximation coefficient group 126 may represent values measured at a first time interval (e.g., seven days), the first detail coefficient group 126 may represent values measured at a second, shorter time interval (e.g., twenty-four hours), the second detail coefficient group 126 may represent values measured at a third, even shorter time interval (e.g., twelve hours), and so on until a suitable level of detail is reached (e.g., up to the sampling rate of raw time series data 126).

Quantized coefficient data 138 may be determined for each coefficient group 126. For example, data format modification logic 134 may determine, for each coefficient group 126, quantized coefficient data 138. As will be described in greater detail below, for each coefficient group 126, quantized coefficient data 138 may be organized in one or more quantization levels. In certain embodiments, data format modification logic 134 determines, for each of coefficient group 126, quantized coefficient data 138 by extracting, for each quantization level of the coefficient group 126, a predetermined number of coefficients from the coefficient group 126. The extracted coefficients may have a greater numeric value relative to other coefficients of the coefficient group 126. Data format modification logic 134 may then assign the extracted coefficients to an appropriate one of the one or more quantization levels of the coefficient group 126. This process may be referred to as thresholding the data.

In certain embodiments, encoded quantized coefficient data 140 may be generated by applying one or more encoding algorithms to quantized coefficient data 138 for each of coefficient groups 136. For example, data format modification logic 134 may apply one or more encoding algorithms to quantized coefficient data 138 to generated encoded quantized coefficient data 140. Encoding the quantized coefficient data 138 may compress quantized coefficient data 138, thereby saving bandwidth for transmission of prioritized transfer data 128, as described in greater detail below. In certain embodiments, the encoding algorithm includes one or more of run-length encoding, offset-value encoding, arithmetic coding, and Huffman coding. However, the present disclosure contemplates using any suitable encoding algorithm, according to particular needs.

Prioritized transfer data 128 may be generated for communication via network 118 to user system 102. For example, data format modification logic 134 may generate prioritized transfer data 128 by ordering quantized coefficient data 138 (or encoded quantized coefficient data 140, if quantized coefficient data 138 was encoded) for coefficient groups 136 according to one or more ordering policies 142.

Ordering policies 142 may comprise one or more rules specifying an order in which quantized coefficient data 138 (or encoded quantized coefficient data 140, if quantized coefficient data 138 was encoded) should be communicated to user system 102. Ordering policies 142 define what data is considered important for the recipient computer system (e.g., user system 102) to receive prior to receiving additional data. The particular ordering policies 142 selected may be chosen based on the type of time series data 126 which is being transmitted to user system 102. For example, selecting or otherwise formulating appropriate ordering policies 142 may involve a qualitative analysis of what information a recipient would find interesting in certain data in the context of what the recipient is attempting to achieve.

As a particular example, with certain types of time series data, it may be sufficient to view overall trends in the data first, prior to receiving additional detailed views of the data. In certain embodiments, ordering policies 142 specify an order that prioritizes for communication data reflecting trends in raw time series data 126 (e.g., raw service metrics data) over data reflecting detailed spikes in raw time series data 126 (e.g., raw service metrics data) and prioritizes for communication data reflecting detailed spikes in raw time series data 126 (e.g., raw service metrics data) over data reflecting even greater detail (which, in some cases, may be noise) in raw time series data 126 (e.g., raw service metrics data). In embodiments in which, for each coefficient group 126, the quantized coefficient data 138 for the coefficient group 126 is organized in one or more quantization levels, ordering the quantized coefficient data 138 may include ordering the quantization levels of the coefficient groups 136 according to the ordering policies 142 to generate prioritized transfer data 128. Thus, ordering policies 142 in such embodiments may specify an order in which the quantization levels should be arranged.

In an example in which time series data 126 comprises service metrics data, it may be more important for a user of user system 102 to be presented first with information showing overall trends in the particular service metrics data being represented in a graph. This may allow the user to identify quickly variances from normal behavior over a sampled period of time, possibly allowing the user to investigate or resolve any issues associate with the variance. Thus, in this particular example, ordering policies 142 may specify an order that prioritizes for communication data reflecting trends in the service metrics data over data reflecting detailed spikes in the service metrics data and prioritizes for communication data reflecting detailed spikes in the service metrics data over data reflecting even greater detail in the service metrics data.

Additional details of example processing that may be performed by server system 106 are described below with reference to FIG. 2, as well as FIG. 4.

Returning to user system 102, in certain embodiments, user system 102 is operable to receive prioritized transfer data 128 and decode it in a manner suitable for display on user system 102. In certain embodiments, reverse transformation logic 120 of user system 102 provides this capability of user system 102. For example, user system 102 may receive a first set of prioritized transfer data 128 from server system 106. The first set of prioritized transfer data 128 may provide an approximation of raw time series data 126, but with the most interesting data only and with lower-level details of the data missing (as determined by the selected transform and ordering policies 142). Reverse transformation logic 120 may apply a reverse transform to the received prioritized transfer data 128. This reverse transform may reformat the data from the transform domain (e.g., the wavelet domain in the case of a wavelet transform) back into the original domain of the data (e.g., the time domain for time series data). User system 102 may display the resulting reformatted data in a display of user system 102, in one or more graphs for example. As user system 102 receives additional prioritized transfer data 128, user system 102 (e.g., reverse transformation logic 120) may continue to apply the reverse transform to the received prioritized transfer data 128, and a user of user system 102 may observe a graph of the time series data 126 continuing to fill in with additional details of the original raw time series data 126.

In operation of an example embodiment of system 100, user system 102 may receive via network 104 at least a portion of prioritized transfer data 128 from server system 106. The receipt by user system 102 of prioritized transfer data 128 may be in response to a request by user system 102 to view at least a portion of raw time series data 126. User system 102 may apply a reverse transform on the received prioritized transfer data 128 for display of a representation of the prioritized transfer data 128 on a display associated with the user system 102. Although a reverse transform is described, the present disclosure contemplates user system 102 applying any suitable decoding algorithms for processing received prioritized transfer data 128 for display. User system 102 may display the reformatted time series data corresponding to the prioritized transfer data 128.

User system 102 may determine whether additional prioritized transfer data 128 has been received from server system 106 via network 104. If user system 102 determines that additional prioritized transfer data 128 has been received, then user system may return to applying a reverse transform on the received additional prioritized transfer data 128. If user system 102 determines that additional prioritized transfer data 128 has not been received, then a suitable application on user system 102 may enter a "waiting" state in which it waits for additional prioritized transfer data 128 to be received unless the application is otherwise terminated.

System 100 provides just one example of an environment in which the data transfer technique of the present disclosure may be used. The present disclosure contemplates use of the data transfer technique in any suitable computing environment. Additionally, although functionality is described as being performed by certain components of system 100, the present disclosure contemplates other components performing that functionality. As just one example, functionality described with reference to server system 106 may be performed by one or more components of computing resources 110. Furthermore, although certain components are illustrated as being combined or separate, the present disclosure contemplates separating and/or combining components of system 100 in any suitable manner. As just one example, server system 106 and one or more of computing resources 110 may be combined in a suitable manner.

Certain embodiments of the present disclosure may provide some, none, or all of the following technical advantages. For example, certain embodiments encode time series data on a server processing side in a trends-first and/or interesting data first order rather than in time order. Trends may be defined as long-term changes in the data, representing for example a day-period rise and fall in data sampled every five minutes. Interesting data may be defined as spikes, edges, or other features of the data, which may depart from the typical behavior of the data (i.e., the overall trends of the data). In certain embodiments, by ordering the data in a trends-first and/or interesting data first manner, interesting events may be presented to a user of a recipient user system (e.g., user system 102) in a prioritized manner relative to other portions of the data, and the rest of the details of the data may be supplemented as the remainder of the data set is communicated over network 104. This may allow users over lower-bandwidth connections to see very quickly if there is unusual behavior in the time series data (e.g., in the service metrics data).

FIG. 2 illustrates an example processing of an example data set, which may be performed by the example system 100 of FIG. 1 according to certain embodiments of a present disclosure. The example data set of FIG. 2 is time series data 200, which represents an example set of data that may be processed using techniques of the present disclosure. It should be understood that time series data 200 is provided for example purposes only. The example processing of time series data 200 will be described with reference to example operation of system 100. Thus, for each of a number of operations, a description of the example processing that may occur in FIG. 1 is described first, followed by a description of how that processing may apply to the example time series data 200 of FIG. 2.

In operation of an example embodiment of system 100, server system 106 may access time series data 126 that includes a number of values. As described above, time series data 126 may include service metrics data associated with computing resources 110 that are available over a communication network. In certain embodiments, data format modification logic 134 may store raw time series data 126 in storage module 108 as raw time series data 126. As described above, although referred to as "raw," the present disclosure contemplates any suitable pre-processing of raw time series data 126 prior to receipt by server system 106 (e.g., data format modification logic 134) of raw time series data 126 and/or prior to storage of raw time series data 126 in storage module 108. For example, server system 106 (or another suitable component of system 100) may format (or reformat) raw time series data 126, perform any suitable aggregation of raw time series data 126, or otherwise process raw time series data 126 prior to storing the received raw time series data 126 in storage module 108.

As illustrated in FIG. 2, in a first state 202a, time series data 200 may be in its raw format and may comprise a number of values (in this example, multiple numeric values). For example, time series data 200 may be service metrics data in the format in which it is received by server system 106 from computing resources 110.

Returning to FIG. 1, data format modification logic 134 may transform the values of time series data 126 into multiple coefficient groups 136. For example, data format modification logic 134 may perform this transformation by applying one or more suitable transform algorithms to the values of time series data 126 to determine coefficient groups 136. Each resulting coefficient group 126 may include one or more coefficients. In certain embodiments, a first coefficient group 126 provides a first level of detail of time series data 126 (e.g., the service metrics data), and each additional coefficient group 126 provides progressively more specific levels of detail of time series data 126 (e.g., service metrics data). Data format modification logic 134 may store coefficient groups 136, in storage module 108 for example.

As shown in FIG. 2, a second state 202b may represent time series data 200 after the values of time series data 200 have been transformed into a number of coefficient groups 204 each including one or more coefficients. For example, the coefficient groups in the illustrated example include an approximation group (Approx), a first detail group (Detail_0), and a second detail group (Detail_1). In certain embodiments, the values of time series data 200 are transformed into coefficient groups 204 by applying a wavelet transform such as the discrete wavelet transform to time series data 200.

Server system 106 may receive a request, from user system 102 for example, for display of data corresponding to the accessed time series data 126. The request may specify a time period in which a user of user system 102 is interested. Data format modification logic 134 may access coefficient groups 136 stored in storage module 108. In certain embodiments, data format modification logic 134 accesses the stored coefficient groups 136 in response to the request for display of at least a portion of the time series data 126 associated with the time period specified in the request.

Data format modification logic 134 may determine, for each of coefficient group 126, quantized coefficient data 138 for the coefficient group 126. For example, data format modification logic 134 may quantize a first coefficient group 126, determine whether another coefficient group 126 should be quantized, and if data format modification logic 134 determines that another coefficient group 126 should be quantized, access and quantize the next coefficient group 126. This process may be repeated until all appropriate coefficient groups 136 (e.g., those responsive to the requested based on the time period specified in the request) have been quantized.

As described above, in certain embodiments, for each coefficient group 126 the quantized coefficient data 138 for the coefficient group 126 is organized in one or more quantization levels. Quantized coefficient data 138 for a coefficient group 126 may be determined by: (1) extracting, for each quantization level of the coefficient group 126, a predetermined number of coefficients from the coefficient group 126, the extracted coefficients having a greater numeric value relative to other coefficients of the coefficient group 126; and (2) assigning the extracted coefficients to an appropriate one of the one or more quantization levels of the coefficient group 126. These steps may be performed for each coefficient group 126, resulting in quantized coefficient data 138.

As shown in FIG. 2, a third state 202c may represent quantized coefficient data 206 determined for each coefficient group 204. In the illustrated example, for each coefficient group 204, quantized coefficient data 206 for the coefficient group 204 is organized in multiple levels. For example, for coefficient group 204a, the quantized coefficient data 206a is organized in quantization levels A_0, A_1, and A_2. As another example, for coefficient group 204b, the quantized coefficient data 206b is organized in quantization levels Detail_0_0, Detail_0_1, and Detail_0_2. As another example, for coefficient group 204c, the quantized coefficient data 206c is organized in quantization levels Detail_1_0, Detail_1_1, Detail_1_2, and Detail_1_3.

Data format modification logic 134 may determine, for each coefficient group 126, encoded quantized coefficient data 140 for the coefficient group 126. It should be understood that this encoding process is optional but may provide additional compression of prioritized transfer data 128. As discussed above, in certain embodiments, for each coefficient group 126, the quantized coefficient data 138 for the coefficient group 126 may be organized in one or more quantization levels. In such embodiments, the quantized coefficient data 138 for each of the coefficient groups may be encoded to compress the quantized coefficient data 138 into one or more encoded quantization levels to generated encoded quantized coefficient data 140.

Data format modification logic 134 may order the encoded quantized coefficient data 140 for the coefficient groups 136 according to one or more ordering policies 142. This ordering may result in prioritized transfer data 128 for communication over a communication network (e.g., network 104) to a remote computer system (e.g., user system 102). As described above, for each coefficient group 126, the quantized coefficient data 138 for the coefficient group 126 may be organized in one or more quantization levels. In such embodiments, data format modification logic 134 may encode the quantized coefficient data 138 for each of the coefficient groups 136 to compress the quantized coefficient data 138 into one or more encoded quantization levels, and may order the quantized coefficient data 138 by ordering the encoded quantization levels of the coefficient groups 136. In certain embodiments (e.g., embodiments in which the above-described encoding process is omitted), the ordering may be performed on quantized coefficient data 138. As described above, for each coefficient group 126, the quantized coefficient data 138 for the coefficient group 126 may be organized in one or more quantization levels. In such embodiments, ordering the quantized coefficient data 138 may include ordering the quantization levels of the coefficient groups 136 according to ordering policies 142 to generate prioritized transfer data 128.

As shown in FIG. 2, a fourth state 202d may represent prioritized transfer data 208 for communication over a communication network (e.g., network 104). Prioritized transfer data 208 may be generated by ordering quantized coefficient data 206 according to one or more ordering policies. For example, prioritized transfer data 208 may be generated by ordering the quantization levels of quantized coefficient data 206 according to the one or more ordering policies. In the illustrated example, the resulting order of the quantization levels is A_0, A_1, A_2, Detail_0_0, Detail_0_1, Detail_1_0, Detail_0_2, Detail_1_1, Detail_1_2, and Detail_1_3. The actual prioritized transfer data 208 that may be communicated via network 104 to user system 102 may include the values for each of these quantization levels, communicated in this order.

Data format modification logic 134 may communicate at least a portion of prioritized transfer data 128 according to the above-determined order. For example, data format modification logic 134 may communicate via network 104 to user system 102 at least a portion of prioritized transfer data 128 according to the above-determined order.

Data format modification logic 134 may determine whether there is additional data to transform. For example, data format modification logic 134 may determine whether there is additional raw time series data 126 (e.g., service metrics data) to transform. If data format modification logic 134 determines that there is additional data to transform, then data format modification logic 134 may access the additional raw time series data 126 and repeat the above process. This process may be repeated until all suitable raw time series data 126 has been processed.

Figure 3A:
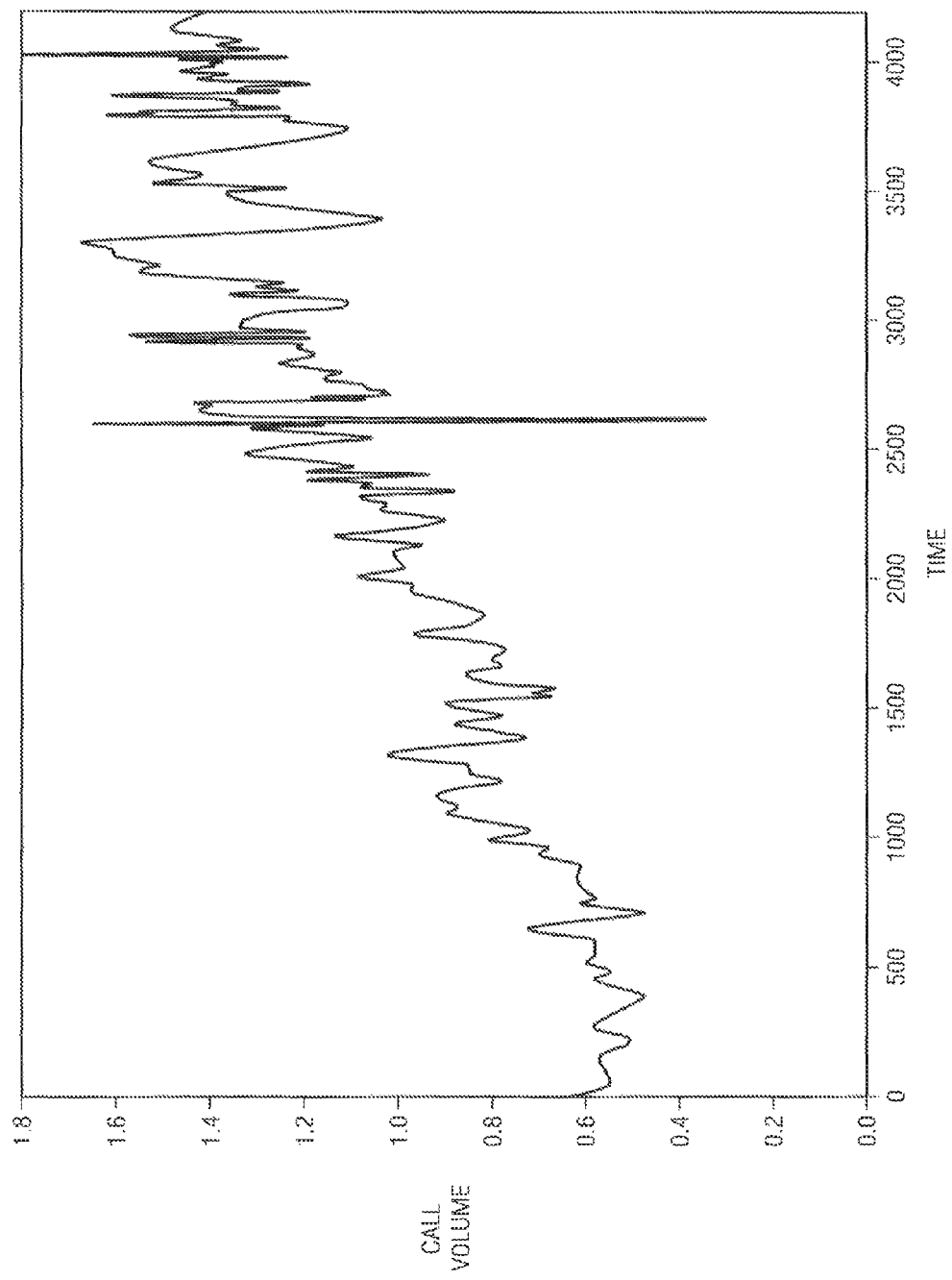
FIGS. 3A through 3C illustrate example output which may be displayed on a recipient user system.
Figure 3B:
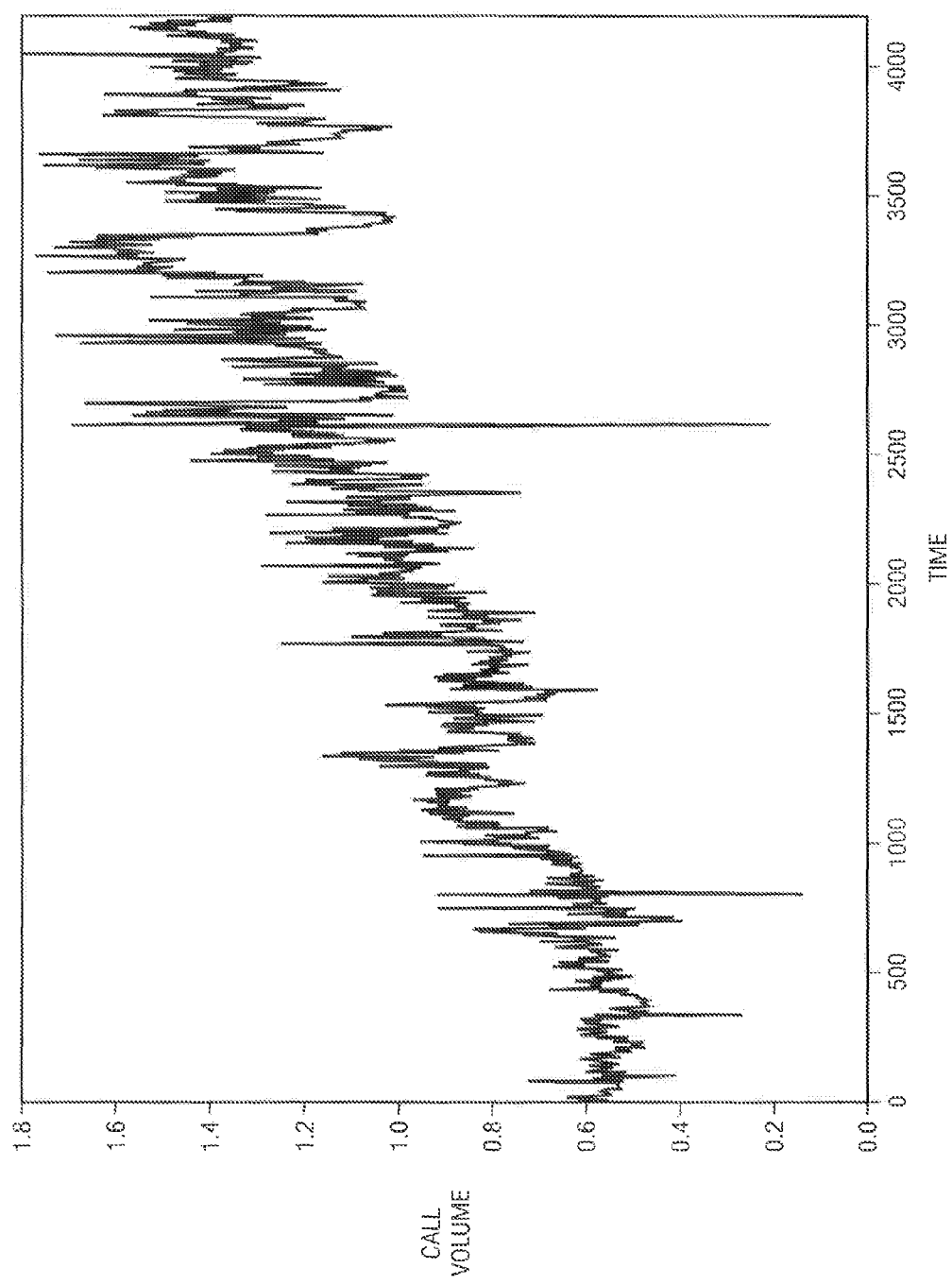
Figure 3C:
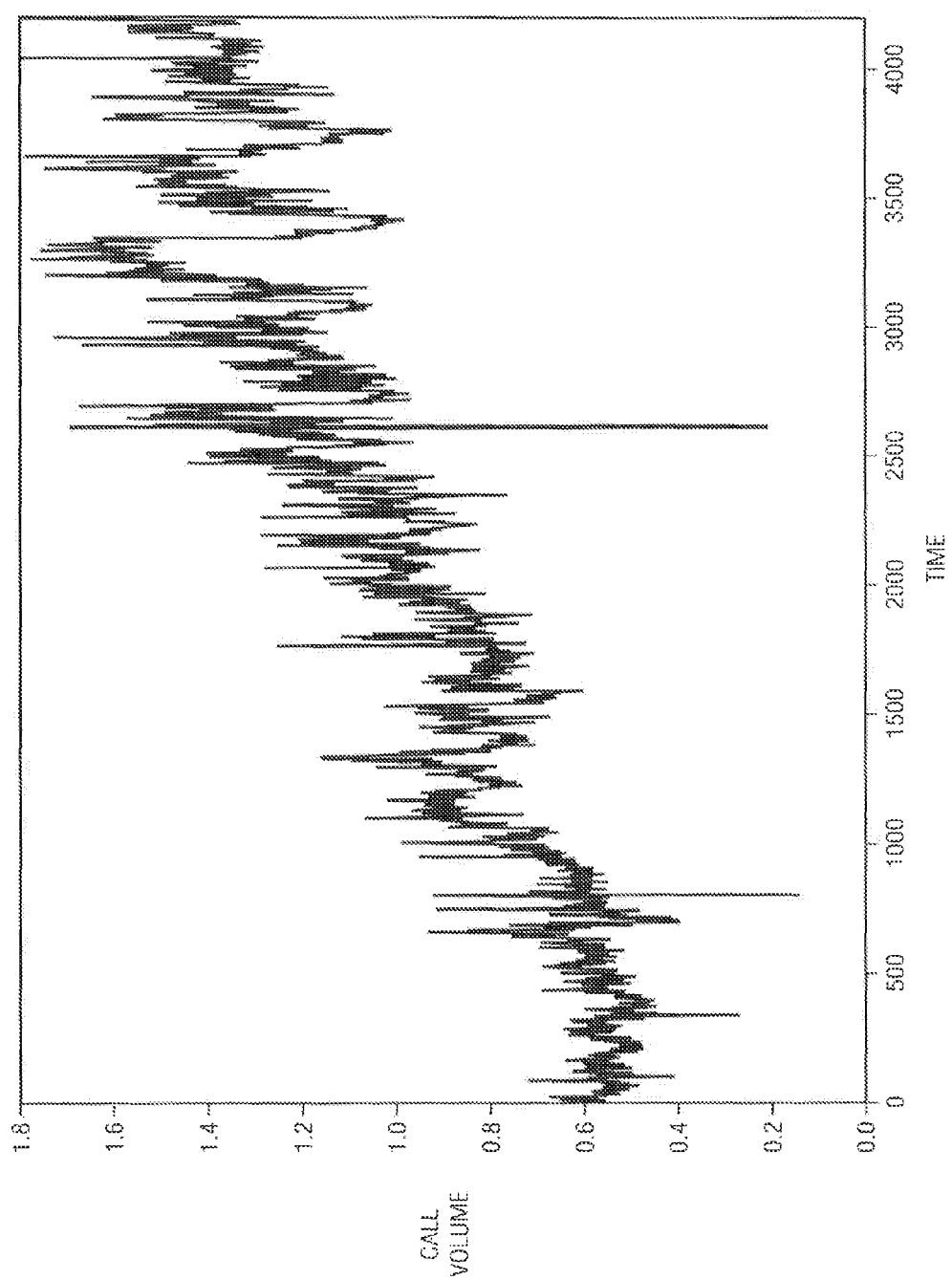

FIGS. 3A through 3C illustrate example output 300 which may be displayed on user system 102. For example, output 300 may be based on prioritized transfer data communicated from server system 106 to user system 102. The arrangement of the icons and other displayed information of output 300 is for example purposes only. The present disclosure contemplates output 300 having any suitable format, according to particular needs. Output 300 of FIGS. 3A through 3C may be generated at first, second, and third times, respectively. Although these particular instances are illustrated and described, output 300 may be generated at any suitable time intervals, according to particular needs. For example, output 300 may be substantially continuously updated as prioritized transfer data 128 is received by user system 102 from server system 106. In certain embodiments, output 300 may be generated based on the data resulting from the transformation that reverse transformation logic 120 applies to received prioritized transfer data 128.

For each of FIGS. 3A through 3C, the x-axis represents time and the y-axis represents a call volume metric. For example, the call volume metric may represent the number of calls from computer systems (e.g., user system 102 and/or other computer systems) to a particular computing resource 110. Although these particular axes are illustrated and described, the present disclosure contemplates the axes of output 300 representing any suitable metrics or other parameters.

FIG. 3A illustrates example output 300a generated at a first time. Output 300a may reflect overall trends in the service metrics data. For example, output 300a may be generated from prioritized transfer data 128 derived from the approximation coefficients that are indicative of one or more trends across the values of the service metrics data according to a first level of detail. Presenting output 300a to a user prior to presenting more detailed views (e.g., output 300b and 300c of FIGS. 3B and 3C, respectively) may allow a user of user system 102 to observe overall trends in the data first, which may be more important or otherwise useful to the user. The subsequent generations of output 300 (e.g., output 300b and output 300c) may complete output 300 with remaining details of the time series data 126.

FIG. 3B illustrates example output 300b generated at a second time. Output 300b may reflect detailed spikes in the service metrics data relative to output 300a. For example, output 300b may be generated from prioritized transfer data 128 derived from the detail coefficients that are indicative of detailed spikes in the values of the service metrics data. Presenting output 300b to a user subsequent to presenting the overall trend data of output 300a (FIG. 3A) may allow a user to observe the overall trends in the data, without the delay in transmission that may be associated with providing the more detailed view of output 300b. Additionally, presenting output 300b to a user prior to presenting more detailed views (e.g., output 300c of FIG. 3C) may allow a user to observe the detailed spikes in the data, without the delay in transmission that may be associated with providing the more detailed view of output 300*c*.

FIG. 3C illustrates example output 300*c* generated at a third time. Output 300*c* may yet greater detail in the service metrics data relative to output 300*b*. As just one example, output 300*c* may be generated from prioritized transfer data 128 derived from the detail coefficients that are indicative of noise in the values of the service metrics data. Presenting output 300*c* to a user subsequent to presenting the overall trend data of output 300*a* (FIG. 3A) and the detailed spikes of output 300*b* (FIG. 3B) may allow a user to observe the overall trends in the data and the detailed spikes in the data, without the delay in transmission that may be associated with providing the additional detail of output 300*c*.

Figure 4A:
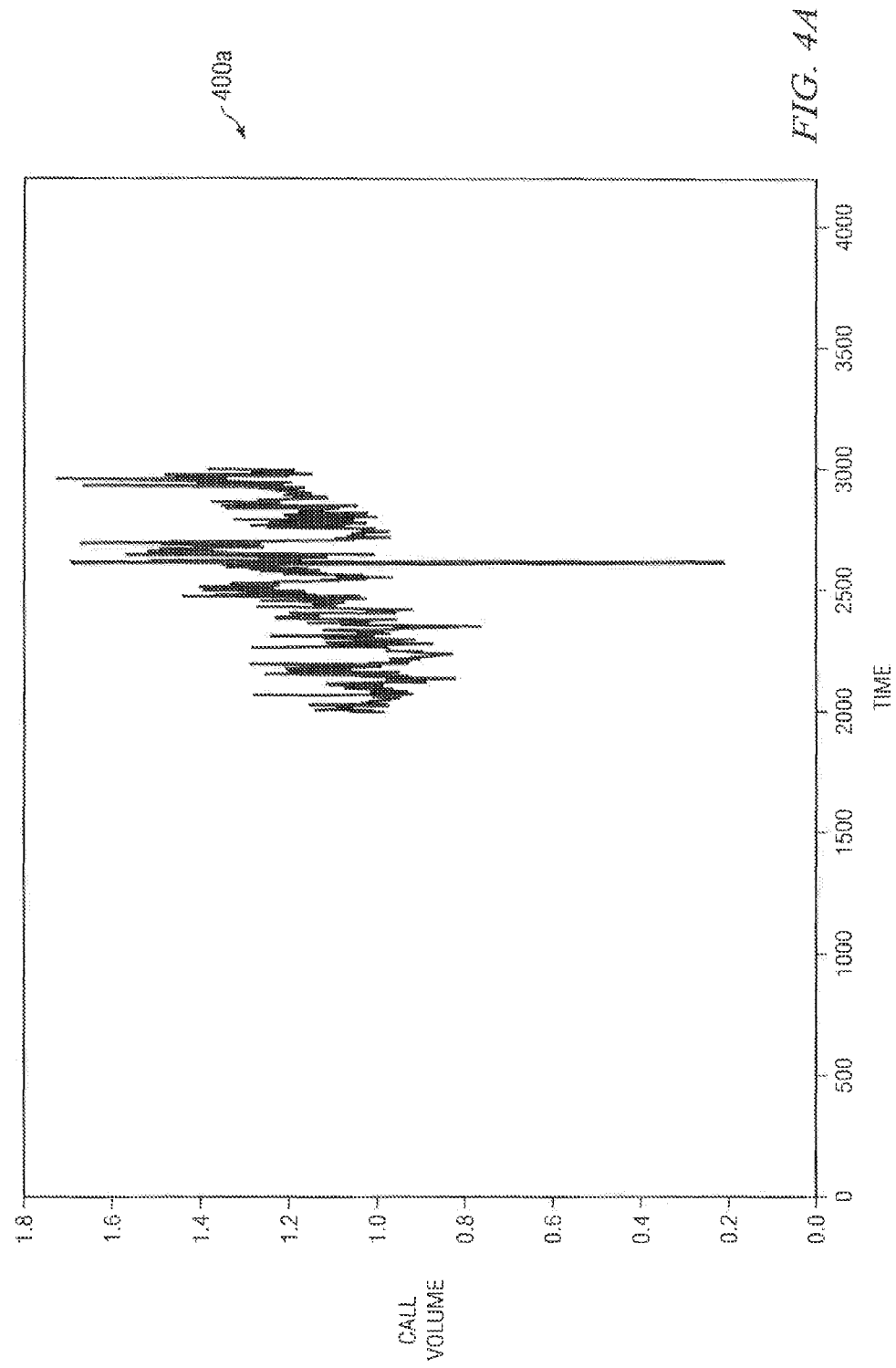
FIGS. 4A through 4C illustrate another example output which may be displayed on a recipient user system.
Figure 4B:
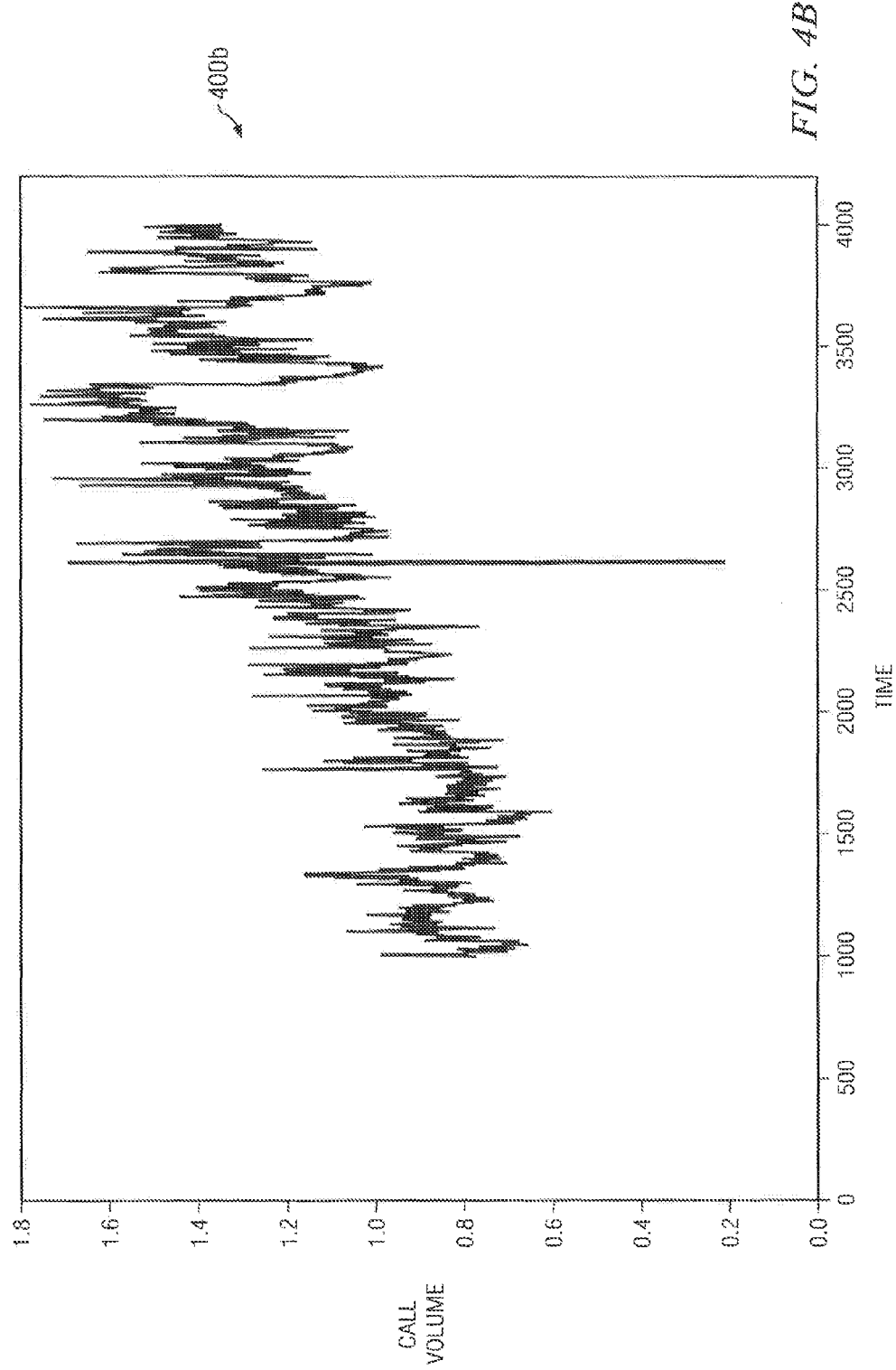
Figure 4C:
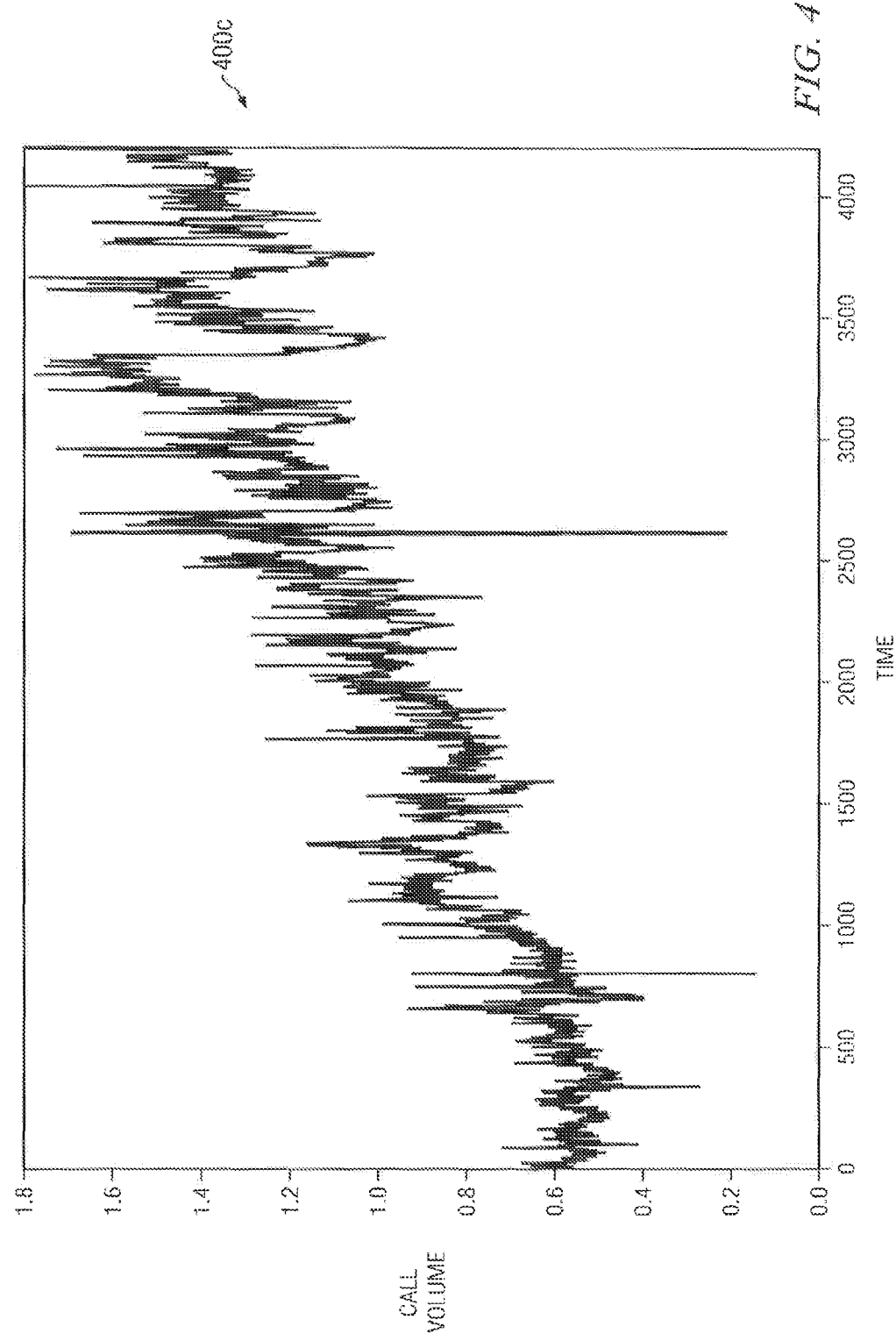

FIGS. 4A through 4C illustrate another example output 400 which may be displayed on user system 102. For example, output 400 may be based on prioritized transfer data 128 communicated from server system 106 to user system 102. The arrangement of the icons and other displayed information of output 400 is for example purposes only. The present disclosure contemplates output 400 having any suitable format, according to particular needs. Output 400 of FIGS. 4A through 4C may be generated at first, second, and third times, respectively. Although these particular instances are illustrated and described, output 400 may be generated at any suitable time intervals, according to particular needs. For example, output 400 may be substantially continuously updated as prioritized transfer data 128 is received by user system 102 from server system 106. In certain embodiments, output 400 may be generated based on the data resulting from the transformation that reverse transformation logic 120 applies to received prioritized transfer data 128.

For each of FIGS. 4A through 4C, the x-axis represents time and the y-axis represents a call volume metric. For example, the call volume metric may represent the number of calls from computer systems (e.g., user system 102 and/or other computer systems) to a particular computing resource 110. Although these particular axes are illustrated and described, the present disclosure contemplates the axes of output 300 representing any suitable metrics or other parameters.

As shown in FIGS. 4A-4C, the output 400 displayed at each of the first, second, and third times may correspond to a particular time period of time series data 126. For example, FIG. 4A illustrates example output 400*a* generated from prioritized transfer data 128 corresponding to time series data 126 for a first time period (i.e., approximately 2000 to approximately 3000 in this example). As another example, FIG. 4B illustrates example output 400*b* generated from prioritized transfer data 128 corresponding to time series data 126 for a second time period (i.e., approximately 1000 to approximately 4000 in this example). The display may continue to show output 400*a*. As another example, FIG. 4C illustrates example output 400*c* generated from prioritized transfer data 128 corresponding to time series data 126 for a third time period (i.e., approximately 0 to the end of the x-axis in this example). The display may continue to show output 400*a* and output 400*b*.

In certain embodiments, a user of user system 102 may be able to zoom on a selected portion of the displayed output (e.g., output 300 or output 400), such that additional details regarding the selected portion of the displayed output are displayed. Taking output 400 as an example, in certain embodiments, the user of user system 102 may select a portion of the displayed output 400, and additional prioritized transfer data 128 providing further details of the selected portion of output 400 may be accessed, with output 400 being updated to reflect the further details of the accessed prioritized transfer data 128. As just one example scenario, a user may select a portion of output 400*a* on which to zoom even prior to the display of output 400*b* or 400*c*, which may allow a user to quickly identify interesting portion(s) of a graph and to view additional details of the identified portion(s) even prior to the display of all of the output.

Figure 5:
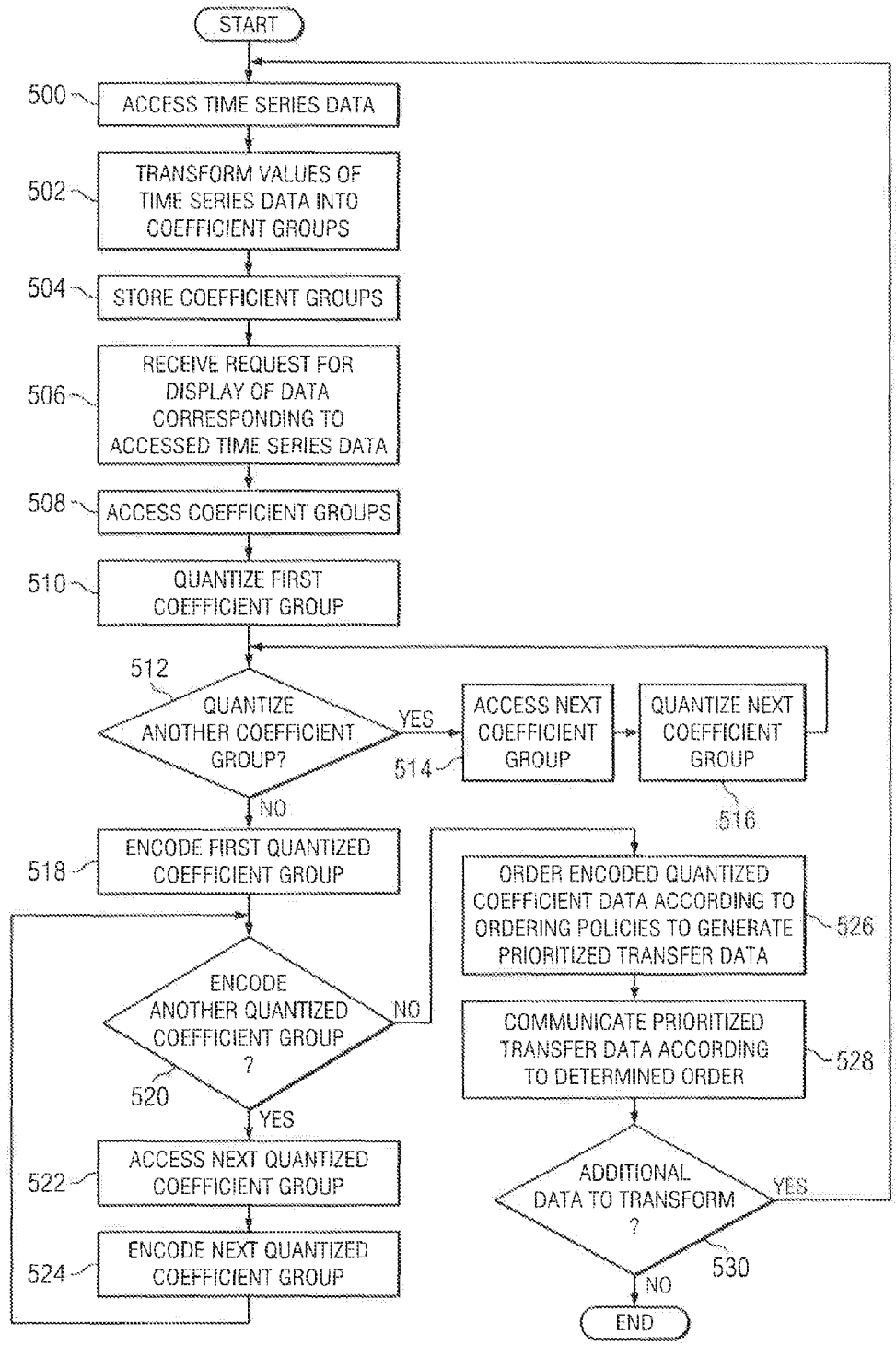
FIG. 5 illustrates an example method for formatting data for communication over a network, which may be performed by the example system of FIG. 1 according to certain embodiments of a present disclosure.

FIG. 5 illustrates an example method for formatting data for communication over network 104, which may be performed by the example system 100 of FIG. 1 according to certain embodiments of a present disclosure. The method may be implemented in any suitable combination of software, firmware, and hardware. Although particular components may be identified as performing particular steps, the present disclosure contemplates any suitable components performing the steps according to particular needs.

At step 500, server system 106 accesses time series data 126 that includes a number of values. In certain embodiments, time series data 126 comprises service metrics data associated with computing resources 110 that are available over a communication network. For example, time series data 126 may comprise service metrics data associated with the provision of computing resources 110 over a network (which may or may not be network 104). Time series data 126 (e.g., the service metrics data) may include a number of values collected at one or more suitable time intervals. In certain embodiments, the values of the time series data are separated by a time period according to a data sampling rate for sampling a set of data. Throughout the remaining description of this example method, it will be assumed for example purposes only that the data being processed comprises time series data 126 (and more particularly service metrics data); however, the present disclosure contemplates the data being processed comprising any suitable type of data, according to particular needs. In certain embodiments, data format modification logic 134 may store raw time series data 126 in storage module 108 as raw time series data 126.

At step 502, data format modification logic 134 may transform the values of time series data 126 into multiple coefficient groups 136. For example, data format modification logic 134 may perform this transformation by applying one or more suitable transform algorithms to the values of time series data 126 to determine coefficient groups 136. Example transformation algorithms may include the discrete wavelet transform, discrete cosign transform, and discrete Fourier transform. Each resulting coefficient group 126 may include one or more coefficients.

In certain embodiments, a first coefficient group 126 provides a first level of detail of time series data 126 (e.g., the service metrics data), and each additional coefficient group 126 provides progressively more specific levels of detail of time series data 126 (e.g., service metrics data). For example, the one or more coefficients of a first coefficient group 126 may comprise approximation coefficients indicative of one or more trends across the values of time series data 126 according to a first level of detail. As another example, the one or more coefficients of a second coefficient group 126 may comprise detail coefficients indicative of trends across the values of time series data 126 according to a second level of detail. As another example, the one or more coefficients of a third coefficient group 126 may comprise detail coefficients indicative of trends across time series data 126 according to a third level of detail. The second level of detail may be a more specific level of detail relative to the first level of detail, and the third level of detail may be a more specific level of detail relative to the second level of detail.

At step 504, data format modification logic 134 may store coefficient groups 136. For example, data format modification logic 134 may store coefficient groups 136 in storage module 108. The stored coefficient groups 136 may correspond to a time period for the values of raw time series data 126. In other words, if the raw time series data 126 to which a transform algorithm is applied is for a time period spanning time one to time two, then the stored coefficient groups 136 resulting from application of the transformation algorithms may also correspond to the time period spanning time one to time two.

At step 506, server system 106 may receive a request for display of data corresponding to the accessed time series data 126. For example, server system 106 may receive a request from user system 102 for display of data corresponding to the accessed time series data 126. The request may specify a time period in which a user of user system 102 is interested.

At step 508, data format modification logic 134 may access coefficient groups 136 stored in storage module 108. In certain embodiments, data format modification logic 134 accesses the stored coefficient groups in response to the request for display of at least a portion of the time series data 126 associated with the time period specified in the request. For example, server system 106 may receive raw time series data 126 on a substantially continuous basis or at any other suitable interval and data format modification logic 134 may apply the transform algorithm to the received data and store the results of the transformation (e.g., as coefficient groups 136). These coefficient groups may be indexed by or otherwise accessible according to a time. This time may correspond to the time associated with the raw time series data 126 represented by the coefficient groups. Data format modification logic 134 may use the time period specified in a request received from user system 102 to access responsive or otherwise appropriate coefficient groups 136 according to the times used to index those coefficient groups 136.

At steps 510-516, data format modification logic 134 may determine, for each of coefficient group 126, quantized coefficient data 138 for the coefficient group 126. For example, at step 510, data format modification logic 134 may quantize a first coefficient group 126. At step 512, data format modification logic 134 may determine whether another coefficient group 126 should be quantized. If at step 512 data format modification logic 134 determines that another coefficient group 126 should be quantized, then at step 514 data format modification logic 134 may access the next coefficient group 126. At step 516, data format modification logic 134 may quantize the next coefficient group 126. The method may return to step 512 for data format modification logic 134 to determine whether another coefficient group 126 should be quantized. Returning to step 512, if data format modification logic 134 determines that there is not another coefficient group 126 to quantize, then the method may proceed to step 518.

In certain embodiments, for each coefficient group 126, the quantized coefficient data 138 for the coefficient group 126 is organized in one or more quantization levels. In certain embodiments, quantized coefficient data 138 for a coefficient group 126 is determined by: (1) extracting, for each quantization level of the coefficient group 126, a predetermined number of coefficients from the coefficient group 126, the extracted coefficients having a greater numeric value relative to other coefficients of the coefficient group 126; and (2) assigning the extracted coefficients to an appropriate one of the one or more quantization levels of the coefficient group 126. These steps may be performed for each coefficient group 126, resulting in quantized coefficient data 138.

At steps 518-524, data format modification logic 134 may determine, for each coefficient group 126, encoded quantized coefficient data 140 for the coefficient group 126. It should be understood that this encoding process is optional but may provide additional compression of prioritized transfer data 128. For example, at step 518, data format modification logic 134 may encode a first quantized coefficient group. A quantized coefficient group may include quantized coefficient data 138 corresponding to a coefficient group 126. For example, the first quantized coefficient group may include quantized coefficient data 138 corresponding to a first coefficient group 126. At step 520, data format modification logic 134 may determine whether another quantized coefficient group should be encoded. If at step 520 data format modification logic 134 determines that another quantized coefficient group should be encoded, then at step 522 data format modification logic 134 may access the next quantized coefficient group. At step 522 data format modification logic 134 may encoded the next quantized coefficient group. The method may return to step 520 for data format modification logic 134 to determine whether another quantized coefficient group should be encoded. Returning to step 520, if data format modification logic 134 determines that there is not another quantized coefficient group to encode, then the method may proceed to step 526.

As discussed above, in certain embodiments, for each coefficient group 126, the quantized coefficient data 138 for the coefficient group 126 is organized in one or more quantization levels. In such embodiments, the quantized coefficient data 138 for each of the coefficient groups may be encoded to compress the quantized coefficient data 138 into one or more encoded quantization levels to generated encoded quantized coefficient data 140.

At step 526, data format modification logic 134 may order the encoded quantized coefficient data 140 for the coefficient groups 136 according to one or more ordering policies 142 to generate prioritized transfer data 128 for communication over a communication network (e.g., network 104) to a remote computer system (e.g., user system 102). In certain embodiments, ordering policies 142 may be determined according to a type of time series data 126.

As described above, for each coefficient group 126, the quantized coefficient data 138 for the coefficient group 126 may be organized in one or more quantization levels. In such embodiments, data format modification logic 134 may encode the quantized coefficient data 138 for each of the coefficient groups 136 to compress the quantized coefficient data 138 into one or more encoded quantization levels, and may order the quantized coefficient data 138 by ordering the encoded quantization levels of the coefficient groups 136.

In certain embodiments (e.g., embodiments in which the encoding process described above with respect to steps 518-524 is omitted), the ordering may be performed on quantized coefficient data 138. The order of quantized coefficient data 138 may include the quantized coefficient data 138 for a first coefficient group 126 (e.g., the approximation coefficients) followed by at least a portion of the quantized coefficient data 138 for a second coefficient group 126 (e.g., a first detail level of coefficients) followed by at least a portion of the quantized coefficient data 138 for a third coefficient group 126 (e.g., a second detail level of coefficients), and so on. As described above, for each coefficient group 126, the quantized coefficient data 138 for the coefficient group 126 may organized in one or more quantization levels. In such embodiments, ordering the quantized coefficient data 138 may include ordering the quantization levels of the coefficient groups 136 according to ordering policies 142 to generate prioritized transfer data 128.

As described above, in certain embodiments, ordering policies 142 specify an order that prioritizes for communication data reflecting trends in time series data 126 (e.g., service metrics data) over data reflecting detailed spikes in time series data 126 (e.g., service metrics data). Additionally, ordering policies 142 may specify an order that prioritizes for communication data reflecting detailed spikes in time series data 126 (e.g., service metrics data) over data reflecting yet greater detail (which may include noise) in time series data 126 (e.g., service metrics data).

At step 528, data format modification logic 134 may communicate at least a portion of prioritized transfer data 128 according to the order determined at step 526. For example, data format modification logic 134 may communicate via network 104 to user system 102 at least a portion of prioritized transfer data 128 according to the order determined at step 526.

At step 530, data format modification logic 134 may determine whether there is additional data to transform. For example, data format modification logic 134 may determine whether there is additional raw time series data 126 (e.g., service metrics data) to transform. If data format modification logic 134 determines at step 530 that there is additional data to transform, then the method may return to step 500 to access additional data to transform. If data format modification logic 134 determines at step 530 that there is not additional data to transform, then the method may end.

In certain embodiments, the above-described method may be performed in response to a user request (e.g., from user system 102) for time series data 126 corresponding to a particular time period. Time series data 126 responsive to the request may already be stored in storage module 108, possibly even as coefficient groups 136. For example, data format modification logic 134 may substantially continuously transform service metrics data 126 as service metrics data 126 is received from computing resources 110 to generate coefficient groups 136. Then, in response to a user request (e.g., from user system 102) for data associated with a particular time period, data format modification logic 134 may retrieve relevant coefficient groups 136 and perform the additional processing described above to generate prioritized transfer data 128. As user system 102 continues to receive prioritized transfer data 128, user system 102 may receive a more detailed view of time series data 126. Additionally or alternatively, data format modification logic 134 may substantially continuously receive time series data 126 from computing resources 110, generate prioritized transfer data 128, and communicate the generated prioritized transfer data 128 to user system 102, which may provide user system 102 with a substantially real-time view of the raw time series data 126.

Figure 6:
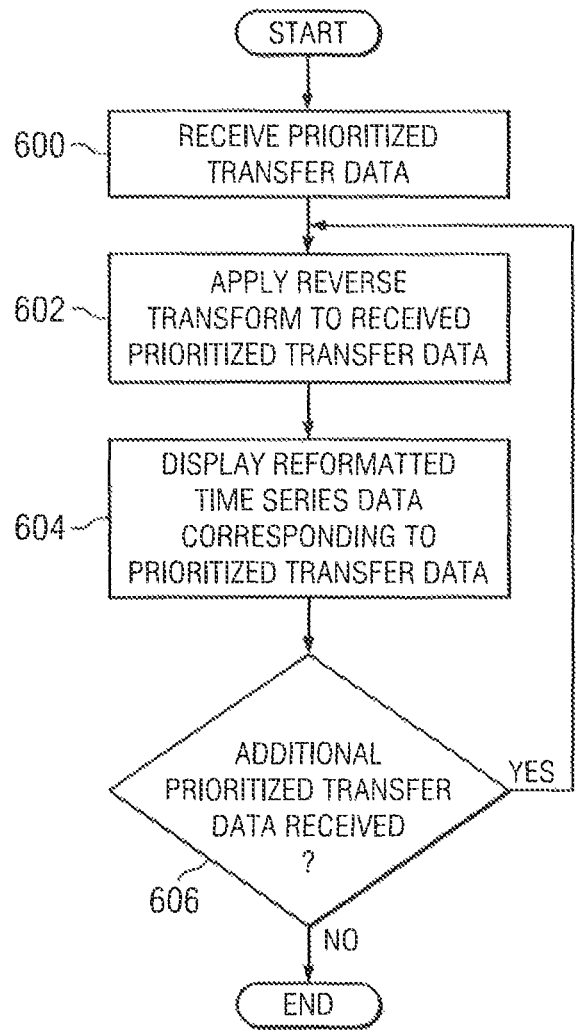
FIG. 6 illustrates an example method for processing data received from a server system over a network, which may be performed by the example system of FIG. 1 according to certain embodiments of a present disclosure.

FIG. 6 illustrates an example method for processing data received from server system 106 over network 104, which may be performed by the example system 100 of FIG. 1 according to certain embodiments of a present disclosure. The method may be implemented in any suitable combination of software, firmware, and hardware, according to particular needs. Although particular components may be identified as performing particular steps, the present disclosure contemplates any suitable components performing the steps according to particular needs.

At step 600, user system 102 may receive via network 104 at least a portion of prioritized transfer data 128 from server system 106. The receipt by user system 102 may be at a first time and may comprise a first set of prioritized transfer data 128. The first set of prioritized transfer data 128 may correspond to a first portion of raw time series data 126. The receipt by user system 102 of prioritized transfer data 128 may be in response to a request by user system 102 to view at least a portion of raw time series data 126.

At step 602, user system 102 (e.g., reverse transformation logic 120) may apply a reverse transform on the received prioritized transfer data 128 for display of a representation of the prioritized transfer data 128 on a display associated with the user system 102. For example, reverse transformation logic 120 may apply a reverse transform to the first of prioritized transfer data to generate first reformatted time series data for the first portion of the time series data. Application of the reverse transform may transform the received prioritized transfer data 128 from the transform domain (e.g., the wavelet domain) back into the domain of time series data 126 (e.g., the time domain). Although a reverse transform is described, the present disclosure contemplates user system 102 applying any suitable decoding algorithms for processing received prioritized transfer data 128 for display.

At step 604, user system 102 may display the reformatted time series data corresponding to the prioritized transfer data 128. For example, user system 102 may display a representation (e.g., a graph) of the first reformatted time series data on a display of user system 102. The displayed representation of the first reformatted time series data may provide a first level of detail of the time series data 126.

At step 606, user system 102 may determine whether additional prioritized transfer data 128 has been received from server system 106 via network 104. If user system 102 determines at step 606 that additional prioritized transfer data 128 has been received, then the method may return to step 602. For example, user system 102 may receive, at a second time, a second set of prioritized transfer data 128 communicated over network 104. The second set of prioritized transfer data 128 may correspond to a second portion of raw time series data 126. User system 102 (e.g., reverse transformation logic 120) may apply the reverse transform to the second set of prioritized transfer data 128 to generate second reformatted time series data for the second portion of raw time series data 126. Application of the reverse transform may transform the received prioritized transfer data 128 from the transform domain (e.g., the wavelet domain) back into the domain of time series data 126 (e.g., the time domain). User system 102 may display the reformatted time series data corresponding to the prioritized transfer data 128. For example, user system 102 may display a representation (e.g., a graph) of the second reformatted time series data on a display of user system 102. The displayed representation of the second reformatted time series data may provide a second level of detail of the time series data 126. This process may be repeated a suitable number of times until the available details of raw time series data 126 are displayed on a display of user system 102 or the process is otherwise terminated, as described below.

If user system 102 determines at step 606 that additional prioritized transfer data 128 has not been received, then the method may end. While the method is described as ending, it should be understood that a suitable application on user system 102 may enter a "waiting" state in which it waits for additional prioritized transfer data 128 to be received unless the application is otherwise terminated.

Although in the example method described with reference to FIG. 6, user system 102 displays the reformatted time series data, the present disclosure contemplates that user system 102 may additionally or alternatively process the data in some other manner. For example, user system 102 may analyze the reformatted times series data in the time order in which it is received via network 104 and perform some action based on that analysis. As a particular example, user system 102 may analyze the reformatted times series data for a first time, determine that an alert should be generated based on that analysis, and cause the alert to be generated. In certain embodiments, this analysis and determination may be generated based on the reformatted times series data for the first time without waiting for reformatted time series data for subsequent times because the reformatted times series data for the first time may provide sufficient detail for user system 102 to recognize the need for an alert.

Figure 7:
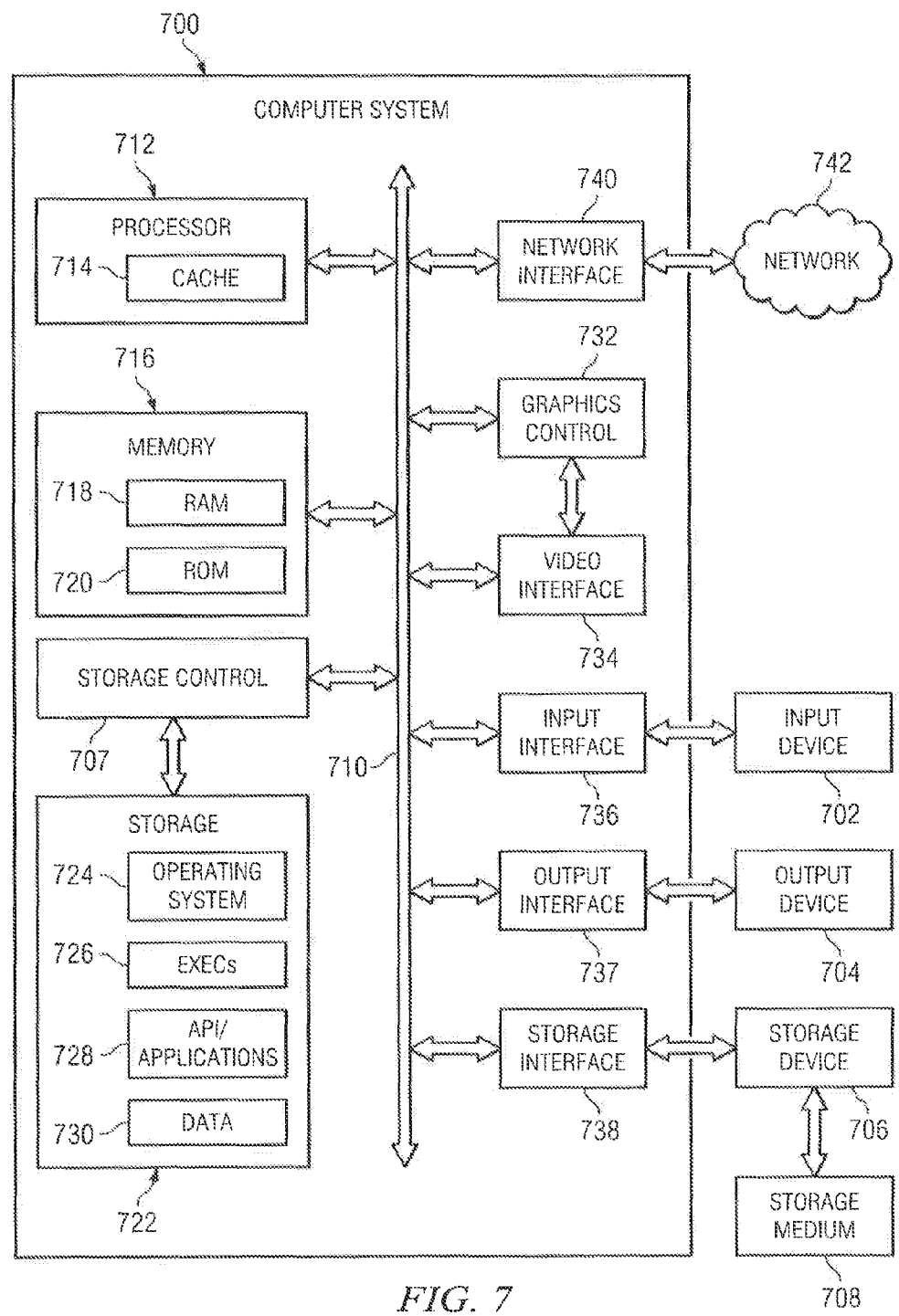
FIG. 7 illustrates an example computer system that may be used for one or more portions of the example system of FIG. 1, according to certain embodiments of the present disclosure.

FIG. 7 illustrates an example computer system 700 that may be used for one or more portions of the example system 100 of FIG. 1, according to certain embodiments of the present disclosure. Although the present disclosure describes and illustrates a particular computer system 700 having particular components in a particular configuration, the present disclosure contemplates any suitable computer system having any suitable components in any suitable configuration. Moreover, computer system 700 may have take any suitable physical form, such as for example one or more integrated circuit (ICs), one or more printed circuit boards (PCBs), one or more handheld or other devices (such as mobile telephones or PDAs), one or more personal computers, one or more super computers, one or more servers, and one or more distributed computing elements. Portions or all of user system 102, server system 106, storage module 108, and computing resources 110 may be implemented using all of the components, or any appropriate combination of the components, of computer system 700 described below.

Computer system 700 may have one or more input devices 702 (which may include a keypad, keyboard, mouse, stylus, or other input devices), one or more output devices 704 (which may include one or more displays, one or more speakers, one or more printers, or other output devices), one or more storage devices 706, and one or more storage media 708. An input device 702 may be external or internal to computer system 700. An output device 704 may be external or internal to computer system 700. A storage device 706 may be external or internal to computer system 700. A storage medium 708 may be external or internal to computer system 700.

System bus 710 couples subsystems of computer system 700 to each other. Herein, reference to a bus encompasses one or more digital signal lines serving a common function. The present disclosure contemplates any suitable system bus 710 including any suitable bus structures (such as one or more memory buses, one or more peripheral buses, one or more a local buses, or a combination of the foregoing) having any suitable bus architectures. Example bus architectures include, but are not limited to, Industry Standard Architecture (ISA) bus, Enhanced ISA (EISA) bus, Micro Channel Architecture (MCA) bus, Video Electronics Standards Association local (VLB) bus, Peripheral Component Interconnect (PCI) bus, PCI-Express bus (PCI-X), and Accelerated Graphics Port (AGP) bus.

Computer system 700 includes one or more processors 712 (or central processing units (CPUs)). A processor 712 may contain a cache 714 for temporary local storage of instructions, data, or computer addresses. Processors 712 are coupled to one or more storage devices, including memory 716. Memory 716 may include RAM 718 and ROM 720. Data and instructions may transfer bi-directionally between processors 712 and RAM 718. Data and instructions may transfer uni-directionally to processors 712 from ROM 720. RAM 718 and ROM 720 may include any suitable computer-readable storage media.

Computer system 700 includes fixed storage 722 coupled bi-directionally to processors 712. Fixed storage 722 may be coupled to processors 712 via storage control unit 707. Fixed storage 722 may provide additional data storage capacity and may include any suitable computer-readable storage media. Fixed storage 722 may store an operating system (OS) 724, one or more executables (EXECs) 726, one or more applications or programs 728, data 730 and the like. Fixed storage 722 is typically a secondary storage medium (such as a hard disk) that is slower than primary storage. In appropriate cases, the information stored by fixed storage 722 may be incorporated as virtual memory into memory 716. In certain embodiments, fixed storage 722 may include network resources, such as one or more storage area networks (SAN) or network-attached storage (NAS).

Processors 712 may be coupled to a variety of interfaces, such as, for example, graphics control 732, video interface 734, input interface 736, output interface 737, and storage interface 738, which in turn may be respectively coupled to appropriate devices. Example input or output devices include, but are not limited to, video displays, track balls, mice, keyboards, microphones, touch-sensitive displays, transducer card readers, magnetic or paper tape readers, tablets, styli, voice or handwriting recognizers, biometrics readers, or computer systems. Network interface 740 may couple processors 712 to another computer system or to network 742. Network interface 740 may include wired, wireless, or any combination of wired and wireless components. Such components may include wired network cards, wireless network cards, radios, antennas, cables, or any other appropriate components. With network interface 740, processors 712 may receive or send information from or to network 742 in the course of performing steps of certain embodiments. Certain embodiments may execute solely on processors 712. Certain embodiments may execute on processors 712 and on one or more remote processors operating together.

In a network environment, where computer system 700 is connected to network 742, computer system 700 may communicate with other devices connected to network 742. Computer system 700 may communicate with network 742 via network interface 740. For example, computer system 700 may receive information (such as a request or a response from another device) from network 742 in the form of one or more incoming packets at network interface 740 and memory 716 may store the incoming packets for subsequent processing. Computer system 700 may send information (such as a request or a response to another device) to network 742 in the form of one or more outgoing packets from network interface 740, which memory 716 may store prior to being sent. Processors 712 may access an incoming or outgoing packet in memory 716 to process it, according to particular needs.

Certain embodiments involve one or more computer-storage products that include one or more tangible, computer-readable storage media that embody software for performing one or more steps of one or more processes described or illustrated herein. In certain embodiments, one or more portions of the media, the software, or both may be designed and manufactured specifically to perform one or more steps of one or more processes described or illustrated herein. Additionally or alternatively, one or more portions of the media, the software, or both may be generally available without design or manufacture specific to processes described or illustrated herein. Example computer-readable storage media include, but are not limited to, CDs (such as CD-ROMs), FPGAs, floppy disks, optical disks, hard disks, holographic storage devices, ICs (such as ASICs), magnetic tape, caches, PLDs, RAM devices, ROM devices, semiconductor memory devices, and other suitable computer-readable storage media. In certain embodiments, software may be machine code which a compiler may generate or one or more files containing higher-level code which a computer may execute using an interpreter.

As an example and not by way of limitation, memory 716 may include one or more tangible, computer-readable storage media embodying software and computer system 700 may provide particular functionality described or illustrated herein as a result of processors 712 executing the software. Memory 716 may store and processors 712 may execute the software. Memory 716 may read the software from the computer-readable storage media in mass storage device 716 embodying the software or from one or more other sources via network interface 740. When executing the software, processors 712 may perform one or more steps of one or more processes described or illustrated herein, which may include defining one or more data structures for storage in memory 716 and modifying one or more of the data structures as directed by one or more portions the software, according to particular needs.

In certain embodiments, the described processing and memory elements (such as processors 712 and memory 716) may be distributed across multiple devices such that the operations performed utilizing these elements may also be distributed across multiple devices. For example, software operated utilizing these elements may be run across multiple computers that contain these processing and memory elements. Other variations aside from the stated example are contemplated involving the use of distributed computing.

In addition or as an alternative, computer system 700 may provide particular functionality described or illustrated herein as a result of logic hardwired or otherwise embodied in a circuit, which may operate in place of or together with software to perform one or more steps of one or more processes described or illustrated herein. The present disclosure encompasses any suitable combination of hardware and software, according to particular needs.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

Moreover, data transfer techniques consistent with the present disclosure may be used to communicate any suitable type of data over any suitable type of network. For example, although the present disclosure has been described primarily with reference to service metrics data, the present disclosure contemplates processing any suitable type of data for communication of a communication network (e.g., network 104). As just a few particular examples, the present disclosure may be used to process for communication stock market or other financial data, weather data, or any other suitable type of data that it may be desirable to transform, compress, and/or order for communication over a network.

Although the present disclosure has been described with several embodiments, diverse changes, substitutions, variations, alterations, and modifications may be suggested to one skilled in the art, and it is intended that the disclosure encompass all such changes, substitutions, variations, alterations, and modifications as fall within the spirit and scope of the appended claims.

What is claimed is:

1. A non-transitory computer-readable medium comprising software, the software when executed by one or more processing units operable to perform operations comprising:
   receiving, at a first time, a first set of prioritized transfer data communicated over a computer network, wherein the first set of prioritized transfer data corresponds to a first portion of time series data;
   applying a reverse transform to the first set of prioritized transfer data to generate first reformatted time series data for the first portion of the time series data;
   receiving, at a second time, a second set of prioritized transfer data communicated over the computer network, wherein the second set of prioritized transfer data corresponds to a second portion of the time series data; and
   applying the reverse transform to the second set of prioritized transfer data to generate second reformatted time series data for the second portion of the time series data
   wherein:
      the first and second portions of the time series data and the first and second reformatted time series data are in a time domain; and
      the first and second sets of prioritized transfer data are in a wavelet domain.

2. The non-transitory computer-readable medium of claim 1, wherein the software when executed by the one or more processing units is further operable to perform operations comprising:
   displaying a representation of the first reformatted time series data, the displayed representation of the first reformatted time series data providing a first level of detail of the time series data; and
   displaying a representation of the second reformatted time series data, the displayed representation of the second reformatted time series data providing a second level of detail of the time series data.

3. The non-transitory computer-readable medium of claim 1, wherein the software when executed by the one or more processing units is further operable to perform operations comprising performing, at a time prior to receiving at the second time the second set of prioritized transfer data, an action based on the first reformatted time series data for the first portion of the time series data.

4. The non-transitory computer-readable medium of claim 1, wherein the software when executed by the one or more processing units is further operable to perform operations comprising:
   displaying a representation of the first reformatted time series data, the displayed representation of the first reformatted time series data providing a first time period of the time series data; and
   displaying a representation of the second reformatted time series data, the displayed representation of the second reformatted time series data providing a second time period of the time series data.

5. The non-transitory computer-readable medium of claim 1, wherein the software when executed by the one or more processing units is further operable to perform operations comprising:

receiving, at a third time, a third set of prioritized transfer data communicated over the computer network, wherein the third set of prioritized transfer data corresponds to a third portion of the time series data; and applying the reverse transform to the third set of prioritized transfer data to generate third reformatted time series data for the third portion of the time series data.

6. A computer-implemented method, comprising:

receiving, using a computer system at a first time, a first set of prioritized transfer data communicated over a computer network, wherein the first set of prioritized transfer data is in a time domain and corresponds to a first portion of time series data in a wavelet domain;

applying, using the computer system, a reverse transform to the first set of prioritized transfer data to generate first reformatted time series data in the wavelet domain for the first portion of the time series data; and displaying, using the computer system, a representation of the first reformatted time series data;

receiving, using the computer system at a second time, a second set of prioritized transfer data communicated over the computer network, wherein the second set of prioritized transfer data is in the time domain and corresponds to a second portion of the time series data in the wavelet domain;

applying, using the computer system, the reverse transform to the second set of prioritized transfer data to generate second reformatted time series data in the wavelet domain for the second portion of the time series data; and displaying, using the computer system, a representation of the second reformatted time series data.

7. The computer-implemented method of claim 6, wherein:
the representation of the first reformatted time series data provides a first level of detail of the time series data; and
the representation of the second reformatted time series data provides a second level of detail of the time series data.

8. The computer-implemented method of claim 6, further comprising performing, at a time prior to receiving at the second time the second set of prioritized transfer data, an action based on the first reformatted time series data for the first portion of the time series data.

9. The computer-implemented method of claim 6, wherein:
the representation of the first reformatted time series data provides information associated with a first time period of the time series data; and
the representation of the second reformatted time series data provides information associated with a second time period of the time series data.

10. A system, comprising:
one or more memory units; and
one or more processing units operable to:
receive, at a first time, a first set of prioritized transfer data communicated over a computer network, wherein the first set of prioritized transfer data corresponds to a first portion of time series data, the time series data comprising service metrics data, wherein the first set of prioritized transfer data was generated by:
transforming a plurality of values of the first portion of time series data into a plurality of coefficient groups, each coefficient group comprising one or more coefficients;
determining, for each of the plurality of coefficient groups, quantized coefficient data for the coefficient group; and
ordering the quantized coefficient data for the plurality of coefficient groups according to one or more ordering policies;
generate first reformatted time series data for the first portion of the time series data;
receive, at a second time, a second set of prioritized transfer data communicated over the computer network, wherein the second set of prioritized transfer data corresponds to a second portion of the time series data; and
generate second reformatted time series data for the second portion of the time series data.

11. The system of claim 10, wherein:
the first reformatted time series data is generated by applying a reverse transform to the first set of prioritized transfer data; and
the second reformatted time series data is generated by applying the reverse transform to the second set of prioritized transfer data.

12. The system of claim 10, wherein:
the first and second portions of the time series data are in a first domain;
the first and second sets of prioritized transfer data are in a second domain;
the first and second reformatted time series data are in the first domain.

13. The system of claim 10, the one or more processing units further operable to:
display a representation of the first reformatted time series data, the displayed representation of the first reformatted time series data providing a first level of detail of the time series data; and
display a representation of the second reformatted time series data, the displayed representation of the second reformatted time series data providing a second level of detail of the time series data.

14. The system of claim 10, the one or more processing units further operable to perform, at a time prior to receiving at the second time the second set of prioritized transfer data, an action based on the first reformatted time series data for the first portion of the time series data.

15. The system of claim 10, the one or more processing units further operable to:
display a representation of the first reformatted time series data, the displayed representation of the first reformatted time series data providing a first time period of the time series data; and
display a representation of the second reformatted time series data, the displayed representation of the second reformatted time series data providing a second time period of the time series data.

16. The system of claim 10, the one or more processing units further operable to:
receive, at a third time, a third set of prioritized transfer data communicated over the computer network, wherein the third set of prioritized transfer data corresponds to a third portion of the time series data; and
generate third reformatted time series data for the third portion of the time series data.

* * * * *